US008364215B2

(12) United States Patent
Jung et al.

(10) Patent No.: US 8,364,215 B2
(45) Date of Patent: Jan. 29, 2013

(54) MOBILE TERMINAL

(75) Inventors: Jae-Jun Jung, Seoul (KR); Jong-Hwan Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 487 days.

(21) Appl. No.: 12/649,240

(22) Filed: Dec. 29, 2009

(65) Prior Publication Data

US 2011/0003624 A1 Jan. 6, 2011

(30) Foreign Application Priority Data

Jul. 6, 2009 (KR) ........................ 10-2009-0061313
Aug. 27, 2009 (KR) ........................ 10-2009-0079958

(51) Int. Cl.
*H04M 1/00* (2006.01)
*H04M 1/38* (2006.01)

(52) U.S. Cl. ............... 455/575.4; 455/575.1; 455/550.1; 455/90.1; 455/90.3

(58) Field of Classification Search ............... 455/575.4, 455/575.1, 90.1, 550.1
See application file for complete search history.

(56) References Cited

U.S. PATENT DOCUMENTS 7,225,002 B2 * 5/2007 Lee et al. ................... 455/575.4
7,353,052 B2 * 4/2008 Yamasaki .................. 455/575.4
7,522,945 B2 * 4/2009 Kilpi et al. ................. 455/575.1
7,653,422 B2 * 1/2010 Roberts ....................... 455/575.4
7,809,414 B2 * 10/2010 Ohki et al. ................. 455/575.4
8,014,845 B2 * 9/2011 Murakoso et al. .......... 455/575.4
8,108,017 B2 * 1/2012 Jang et al. .................. 455/575.4
2006/0053847 A1 * 3/2006 Taki et al. ....................... 70/247
2007/0243731 A1 * 10/2007 Im ................................. 439/131
2007/0252202 A1 * 11/2007 Park et al. ..................... 257/335
2011/0003624 A1 * 1/2011 Jung et al. .................. 455/575.4

FOREIGN PATENT DOCUMENTS

CN 1770786 5/2006
CN 1855738 11/2006
KR 1020060039750 5/2006

OTHER PUBLICATIONS

In the Intellectual Property Office of China Application Serial No. 201010145206.5, Office Action dated Nov. 5, 2012, 6 pages.

* cited by examiner

*Primary Examiner* — Tilahun B Gesesse

(74) *Attorney, Agent, or Firm* — Lee, Hong, Degerman, Kang & Waimey

(57) ABSTRACT

A mobile terminal includes a first body, a second body, and a slide-tilt module that slides the first body relative to the second body within a first section and tilts the first body to a preset angle relative to the second body within a second section, the slide-tilt module including a sliding unit to slidably connect the first body and the second body to each other and a tilting unit to tilt the first body to the preset angle, such that the tilting unit is inactive and the first body is slid in the first section, and the tilting unit is activated in the second section such that the first body is tilted.

19 Claims, 20 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Applications No. 10-2009-0061313, filed on Jul. 6, 2009 and No. 10-2009-0079958, filed on Aug. 27, 2009, the contents of which are incorporated by reference herein in their entirety.

FIELD OF THE INVENTION

The present disclosure relates to a mobile terminal having upper and lower bodies relatively movably connected to each other. The present disclosure further relates to a mobile terminal having a structure in which an upper body is slidable and tiltable relative to a lower body.

BACKGROUND OF THE INVENTION

Terminals may be divided into mobile/portable terminals and stationary terminals according to their mobility. Further, the mobile terminals may be categorized into a handheld terminal and a vehicle mountable terminal based on modes of their portability.

Mobile terminals are becoming multifunctional and can be used to capture still images or moving images, play music or video files, play games, receive broadcast. Thus, the mobile terminals are implemented as integrated multimedia players.

Mobile terminal users can use their mobile terminals to express their personalities by employing mobile terminals with their desired designs out of various designs available for the mobile terminals. For example, mobile terminals are implemented in various types, such as a bar type, a slide type, a folder type, and a swivel type. In order to support and improve functions of the mobile terminal, a new structural design or improvement in a mobile terminal is desired.

SUMMARY OF THE INVENTION

According to an embodiment of the present invention, a mobile terminal includes a first body, a second body, and a slide-tilt module including a sliding unit slidably connecting the first body to the second body such that the first body slides relative to the second body within a first section and a tilting unit tilting the first body to a preset angle relative to the second body within a second section, such that the tilting unit is inactive and the first body is slid within the first section and the tilting unit is activated within the second section such that the first body is tilted.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

The above and other aspects, features, and advantages of the present invention will become more apparent upon consideration of the following description of preferred embodiments, taken in conjunction with the accompanying drawings. Mobile terminals described in the present disclosure may include mobile phones, smart phones, laptop computers, digital broadcasting terminals, personal digital assistants (PDAs), portable multimedia players (PMPs), and navigators.

Hereinafter, suffixes "module" and "unit" or "portion" for components used herein in description are merely provided only for facilitation of preparing this specification, and thus they are not granted a specific meaning or function. Hence, it should be noticed that "module" and "unit" or "portion" can be used together.

Figure 1:
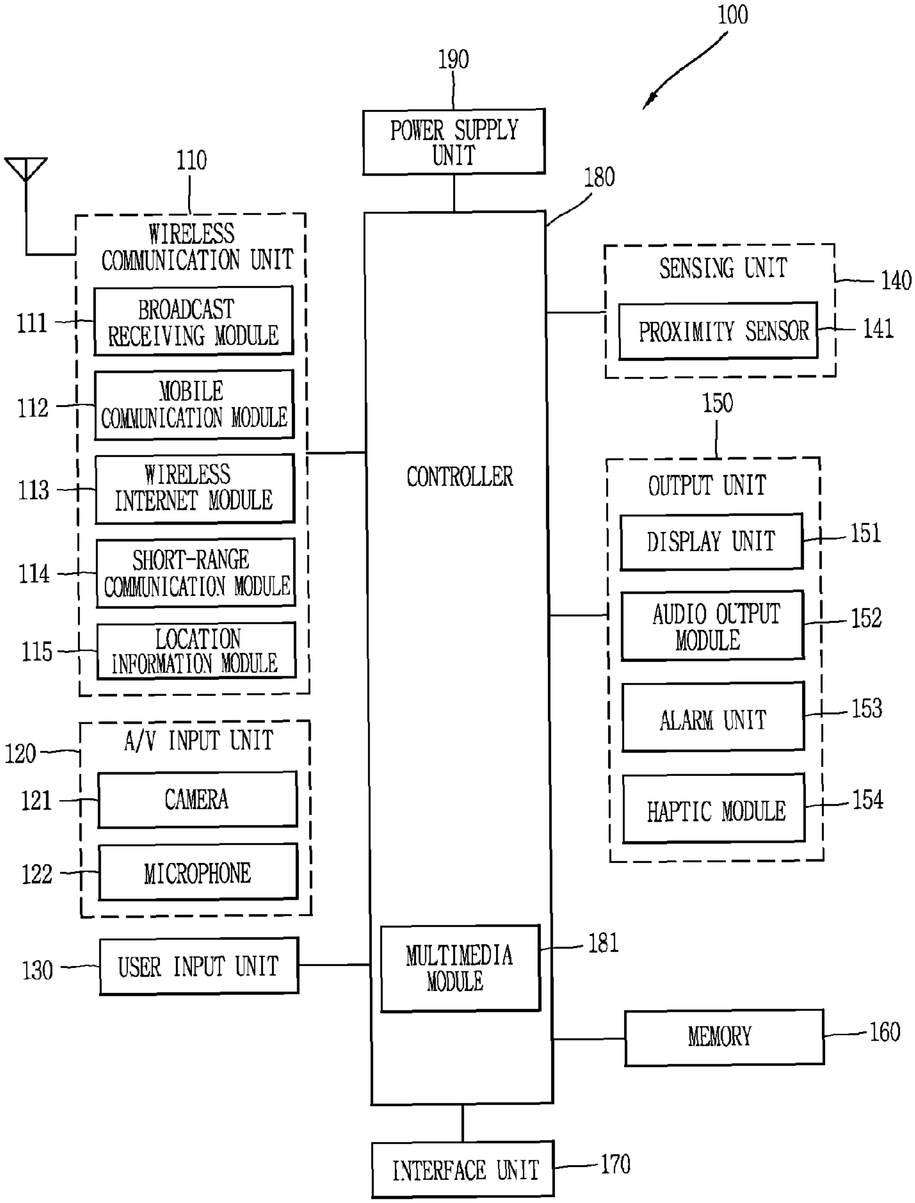
FIG. 1 is a block diagram of a mobile terminal in accordance with one embodiment of the present invention.

FIG. 1 is a block diagram of a mobile terminal in accordance with one embodiment of the present invention. The mobile terminal 100 may include components such as a wireless communication unit 110, an Audio/Video (A/V) input unit 120, a user input unit 130, a sensing unit 140, an output unit 150, a memory 160, an interface unit 170, a controller 180, and a power supply unit 190. While FIG. 1 shows the mobile terminal 100 having various components, it is understood that implementing all of the illustrated components is not a requirement, and thus, greater or fewer components may alternatively be implemented.

Referring to FIG. 1, the wireless communication unit 110 typically includes one or more modules which permit wireless communications between the mobile terminal 100 and a wireless communication system or between the mobile terminal 100 and a network within which the mobile terminal 100 is located. For example, the wireless communication unit 110 includes a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal 100. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information include information associated with a broadcast channel, a broadcast program, and a broadcast service provider. The broadcast associated information may be provided via a mobile communication network, and received by the mobile communication module 112.

The broadcast associated information may be implemented in various formats. For example, broadcast associated information includes Electronic Program Guide (EPG) of Digital Multimedia Broadcasting (DMB) and Electronic Service Guide (ESG) of Digital Video Broadcast-Handheld (DVB-H).

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities, such as a base station, an external mobile terminal, and a server, on a mobile communication network. The wireless signals may include an audio call signal, a video (telephony) call signal, or various formats of data according to transmission/reception of text/multimedia messages.

The wireless Internet module 113 supports wireless Internet access for the mobile terminal 100. The wireless Internet module 113 may be internally or externally coupled to the mobile terminal 100. Examples of such wireless Internet access include Wireless LAN (WLAN) (Wi-Fi), Wireless Broadband (Wibro), Worldwide Interoperability for Microwave Access (Wimax), and High Speed Downlink Packet Access (HSDPA).

The short-range communication module 114 denotes a module for short-range communications. Suitable technologies for implementing the short-range communication module 114 may include BLUETOOTH®, Radio Frequency IDentification (RFID), Infrared Data Association (IrDA), Ultra-WideBand (UWB), and ZigBee®.

The location information module 115 denotes a module for detecting or calculating a position of the mobile terminal 100. An example of the location information module 115 includes a Global Position System (GPS) module.

Further referring to FIG. 1, the A/V input unit 120 is configured to provide audio or video signal input to the mobile terminal 100. The NV input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal 100.

The microphone 122 may receive an external audio signal while the mobile terminal 100 is in a particular mode, such as a phone call mode, a recording mode, or a voice recognition mode. The audio signal is processed into digital data. The processed digital data is converted for output into a format transmittable to a mobile communication base station via the mobile communication module 112 in the phone call mode. The microphone 122 may include assorted noise removing algorithms to remove noise generated while receiving the external audio signal.

The user input unit 130 may generate input data input by a user to control the operation of the mobile terminal 100. The user input unit 130 may include a keypad, a dome switch, a jog wheel, a jog switch or a touchpad operated by static pressure or capacitance.

The sensing unit 140 provides status measurements of various aspects of the mobile terminal 100. For example, the sensing unit 140 detects an open/close status of the mobile terminal 100, a change in a location of the mobile terminal 100, a presence or absence of user contact with the mobile terminal 100, the location of the mobile terminal 100, or acceleration/deceleration of the mobile terminal 100 to generate a sensing signal for controlling the operation of the mobile terminal 100. For example, in a slide-type mobile terminal, the sensing unit 140 may sense whether a sliding portion of the mobile terminal is open or closed.

Other examples include the sensing unit 140 sensing the presence or absence of power provided by the power supply unit 190, the presence or absence of a coupling or other connection between the interface unit 170 and an external device. The sensing unit 140 may include a proximity sensor 141.

The output unit 150 is configured to output an audio signal, a video signal or a tactile signal. For example, the output unit 150 includes a display unit 151, an audio output module 152, an alarm unit 153, and a haptic module 154.

The display unit 151 outputs information processed in the mobile terminal 100. For example, when the mobile terminal 100 is operating in a phone call mode, the display unit 151 provides a User Interface (UI) or a Graphic User Interface (GUI) which includes information associated with the call. As another example, if the mobile terminal 100 is in a video call mode or a capturing mode, the display unit 151 may additionally or alternatively display images captured and/or received, UI, or GUI.

The display unit 151 may be implemented using at least one of a Liquid Crystal Display (LCD), a Thin Film Transistor-Liquid Crystal Display (TFT-LCD), an Organic Light-Emitting Diode (OLED), or a flexible display, a three-dimensional (3D) display. Some of such display units 151 may be implemented as a transparent type or an optical transparent type through which the exterior is visible, which is referred to as "transparent display."

A representative example of the transparent display includes a Transparent OLED (TOLED). The rear surface of the display unit 151 may also be implemented to be optically transparent. Under this configuration, a user can view an object positioned at a rear side of a terminal body through a region occupied by the display unit 151 of the terminal body.

Two or more display units 151 may be implemented according to a configured aspect of the mobile terminal 100. For example, a plurality of the display units 151 may be arranged on one surface to be spaced apart from or integrated with each other, or may be arranged on different surfaces.

If the display unit 151 and a touch sensor have a layered structure therebetween, the structure may be referred to as a "touch screen." The display unit 151 implemented as the touch screen may also be used as an input device in addition to an output device. The touch sensor may be implemented as a touch film, a touch sheet or a touch pad.

The touch sensor may be configured to convert changes of a pressure applied to a specific part of the display unit 151, or a capacitance occurring from a specific part of the display unit 151, into electric input signals. The touch sensor may also be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

As shown in FIG. 1, the proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, or an infrared rays proximity sensor. When the touch screen is implemented as a capacitance type, proximity of a pointer to the touch screen is sensed by changes of an electromagnetic field. In this case, the touch screen or touch sensor may be categorized as the proximity sensor 141.

Hereinafter, for the sake of brief explanation, a status that the pointer is positioned to be proximate onto the touch screen without contact will be referred to as "proximity touch', whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor 141 senses proximity touch and proximity touch patterns including distance, direction, speed, time, position, and moving status. Information relating to the sensed proximity touch and the sensed proximity touch patterns may be output onto the touch screen.

The audio output module 152 outputs audio data received from the wireless communication unit 110 or stored in the memory 160, in a call-receiving mode, a call-placing mode, a recording mode, a voice recognition mode, and a broadcast reception mode. The audio output module 152 may output audio signals relating to functions performed in the mobile terminal 100, for example, sound indicating a call received or a message received. The audio output module 152 may include a receiver, a speaker, and a buzzer.

The alarm unit 153 outputs signals notifying occurrence of events in the mobile terminal 100. The events occurring in the mobile terminal 100 may include call received, message received, key signal input, and touch input. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity and a controllable pattern. For example, different vibration may be output in a synthesized manner or in a sequential manner.

The haptic module 154 may generate various tactile effects, including not only vibration, but also arrangement of pins vertically moving with respect to a skin being touched or contacted, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device. The haptic module 154 may be configured to transmit tactile effects or signals through a user's direct contact, or a user's muscular sense using a finger or a hand. Two or more haptic modules 154 may be implemented according to the configuration of the mobile terminal 100.

The memory 160 may store a program for processing and control of the controller 180. Alternatively, the memory 160 may temporarily store input/output data such as phonebook data, messages, still images, and video. Also, the memory 160 may store data related to various patterns of vibrations and audio output upon a touch input on the touch screen.

The memory 160 may be implemented using any type of suitable storage medium including a flash memory type, a hard disk type, a multimedia card micro type, Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and a memory card type such as SD or DX memory. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the mobile terminal 100, or a data transmission from the mobile terminal 100 to an external device. The interface unit 170 includes, for example, wired/wireless headset ports, external charger ports, wired/wireless data ports, memory card ports, ports for coupling devices having an identification module, audio Input/Output (I/O) ports, video I/O ports, or earphone ports.

The identification module may be configured as a chip for storing various information required to authenticate an authority to use the mobile terminal 100, which may include a User Identity Module (UIM) and a Subscriber Identity Module (SIM). Also, the device having the identification module may be implemented in a type of smart card. Hence, the identification device can be coupled to the mobile terminal 100 via a port.

Further, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, and video calls. The controller 180 may include a multimedia module 181 which provides multimedia playback. The multimedia module 181 may be configured as part of the controller 180 or as a separate component. The controller 180 may also perform a pattern recognition processing to recognize writing or drawing input on the touch screen as text or an image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. The software codes may be stored in the memory 160 and executed by the controller 180.

Figure 2A:
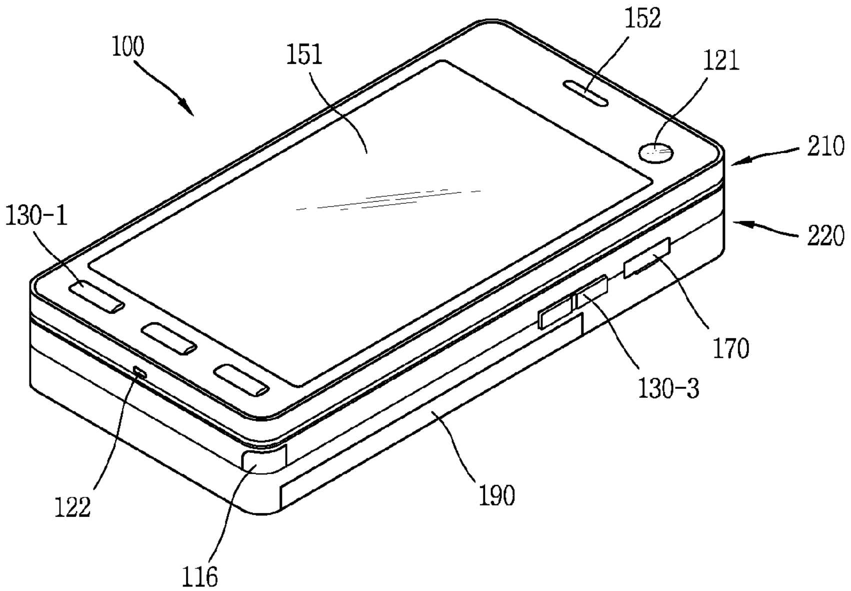
FIGS. 2A and 2B are upper perspective views of a mobile terminal in accordance with one embodiment of the present invention.
Figure 2B:
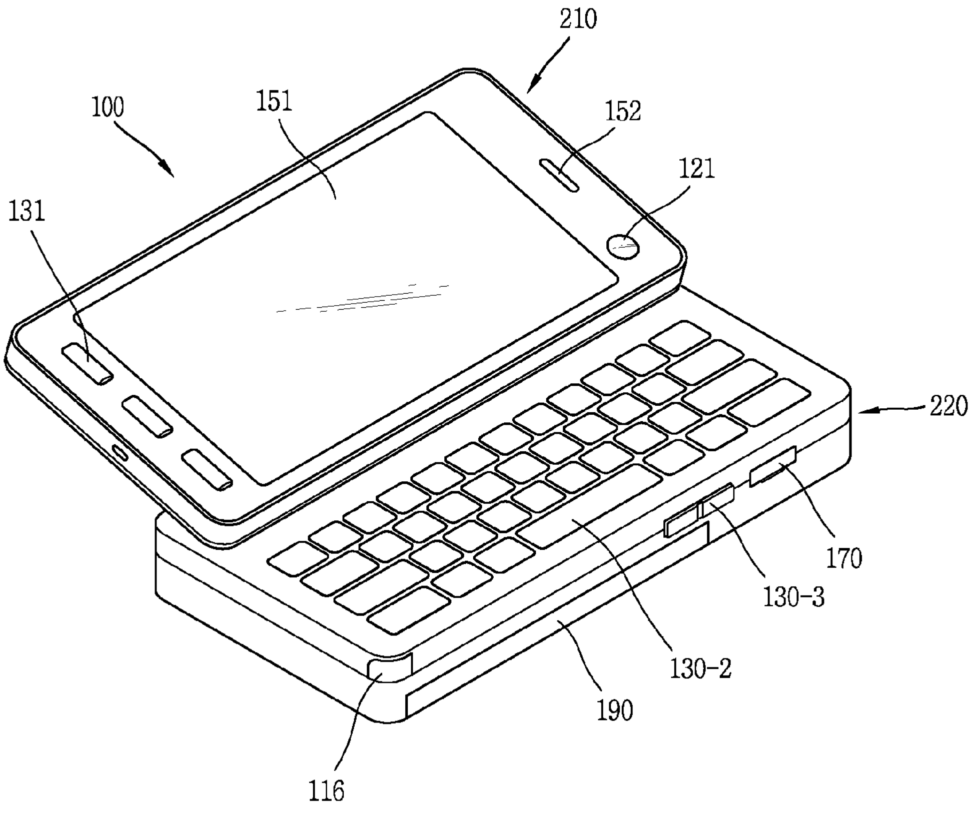

Referring to FIGS. 2A and 2B, the mobile terminal 100 includes an upper body or first body 210 and a lower body or second body 220 coupled to be relatively slidable from each other. The mobile terminal 100 may be converted into a closed configuration and an open configuration according to the relative motion of the upper body 210 and the lower body 220.

As shown in FIG. 2A, when the upper body 210 is positioned over the lower body 220, the mobile terminal 100 is in a closed configuration. As shown in FIG. 2B, when the upper body 210 slides over the lower body 220 and at least a part of an upper surface of the lower body 220 is exposed, the mobile terminal 100 is in an open configuration.

According to an embodiment of the present invention, the upper body 210 is slid within a predetermined section from the closed configuration and thereafter tilted up to a preset angle relative to the lower body 220 such that the mobile terminal 100 is converted into the open configuration. The upper body 210 may be slid in a widthwise direction of the lower body 220 as shown in FIG. 2B or slid in a lengthwise direction of the lower body 220.

Each of the upper body 210 and the lower body 220 includes a case, such as casing, cover, or housing, forming an outer appearance thereof. The cases may be formed by injection-molded synthetic resin, or may be formed using a metallic material such as stainless steel (STS) or titanium (Ti).

In one aspect of the present invention, the upper body 210 has a display unit 151, an audio output module 152, a camera 121, a user input unit 130 including a first manipulation unit 130-1, and a microphone 122 as shown in FIG. 2A. The display unit 151 may occupy most of the upper surface of the upper body 210. The audio output module 152 and the camera 121 may be disposed at a region adjacent to one end of the display unit 151, and the first manipulation unit 130-1 and the microphone 122 may be disposed at a region adjacent to the other end of the display unit 151.

The lower body 220 has additional user input units 130 including second and third manipulation units 130-2 and 130-3, respectively, an interface unit 170, and a power supply unit 190 as shown in FIGS. 2A and 2B. The user input units 130 may be manipulated to allow inputting of commands for controlling operations of the mobile terminal 100, and include first to third manipulation units 130-1, 130-2, and 130-3. The manipulation units 130-1, 130-2, and 130-3 may employ any tactile manner that a user can touch or tap for manipulation.

Contents input via the first to third manipulation units 130-1, 130-2, and 130-3 may be variously set. For example, the first manipulation unit 130-1 may be configured to input commands such as START, END, or SCROLL, and the second manipulation unit 130-2 may be configured to input numerals, characters, and symbols. Further, the third manipulation unit 130-3 may be configured to input commands, such as adjusting a volume output from the audio output module 152 or converting the display unit 151 into a touch recognition mode.

The second manipulation unit 130-2 may be mounted on the upper surface of the lower body 220, and the third manipulation unit 130-3 and the interface unit 170 may be mounted at a side surface of the lower body 220. A broadcast signal receiving antenna 116 may further be disposed at a side surface of the lower body 220 in addition to an antenna for call communications (not shown). The antenna 116 configuring part of the broadcast receiving module 111 may be retracted into a terminal body.

Figure 3:
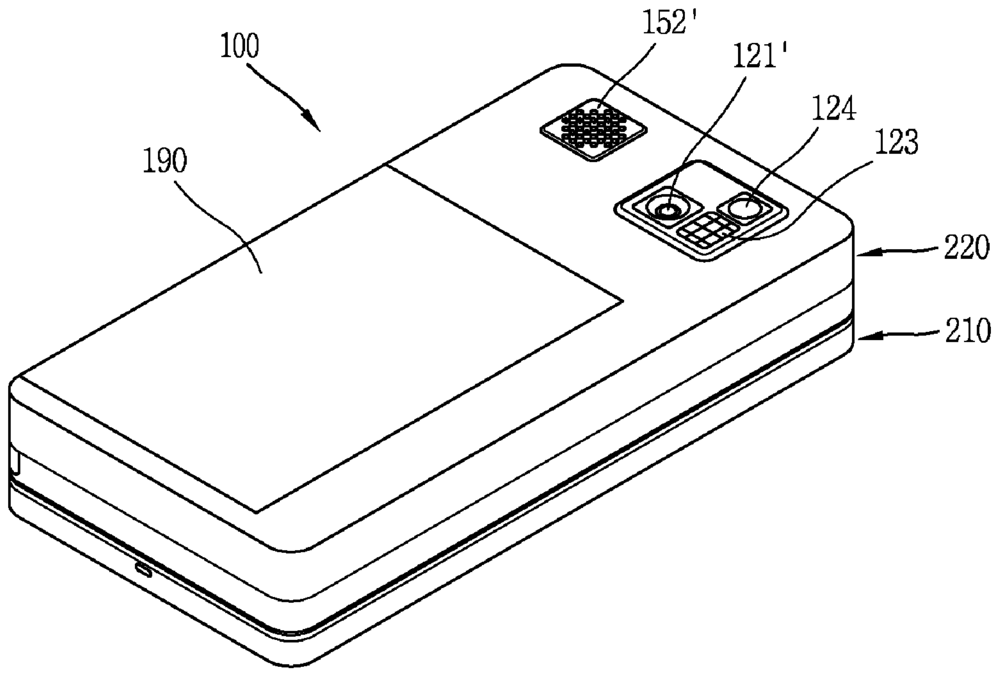
FIG. 3 is a lower perspective view of the mobile terminal in accordance with one embodiment of the present invention.

Referring to FIG. 3, the power supply unit 190 may be attached directly onto a lower surface of the lower body 220 or mounted inside the lower body 220. A second camera 121' may further be disposed at the lower surface of the lower body 220 and the second camera 121' faces a direction which is opposite to a direction faced by the first camera 121 shown in FIGS. 2A and 2B. The first and second cameras 121 and 121' may have different resolutions.

For example, the first camera 121 may have a relatively lower resolution, generating pictures with lower pixels. Thus, the first camera 121 may be useful when a user captures his/her own face and sends it to another party during a video call. On the other hand, the second camera 121' may have a relatively higher resolution, generating pictures with higher resolution such that it can be useful for a user to obtain higher quality pictures for later use. The cameras 121 and 121' may be installed at the terminal body to be rotatable or popped up.

A flash 123 and a mirror 124 may additionally be disposed adjacent to the second camera 121'. The flash 123 operates in conjunction with the second camera 121' when taking a picture using the second camera 121'. The mirror 124 can cooperate with the second camera 121' to allow a user to photograph himself in a self-portrait mode.

A second audio output module 152' may further be disposed at the lower surface of the lower body 220 so as to cooperate with the first audio output module 152 shown in FIG. 2A to provide stereo output. Further, the second audio output module 152' may be configured to operate as a speakerphone.

The foregoing description has given that the second camera 121', second audio output module 152', mirror 124, and flash 123 are disposed at the lower body 220. However, the construction is not limited thereto. For example, at least one of the components, such as the second camera 121', which have been described as disposed at the lower body 220, may alternatively be disposed at the lower surface of the upper body 210. In this case, the component(s) disposed at the upper body 210 can be advantageously protected by the lower body 220 in the closed configuration.

The above described mobile terminal 100 according to FIGS. 2A-3 has a form of a bar type terminal in the closed configuration. The mobile terminal 100 mostly operates in a standby mode or a phone call mode in the closed configuration. In the open configuration of the mobile terminal 100, a user can enter a message or use multimedia functions, such as web-browsing or playing games, via the second manipulation unit 130-2. The display unit 151 provides a comfortable viewing angle to the user according to the structure by which the upper body 210 is tilted to a preset angle in the open configuration.

Figure 4:
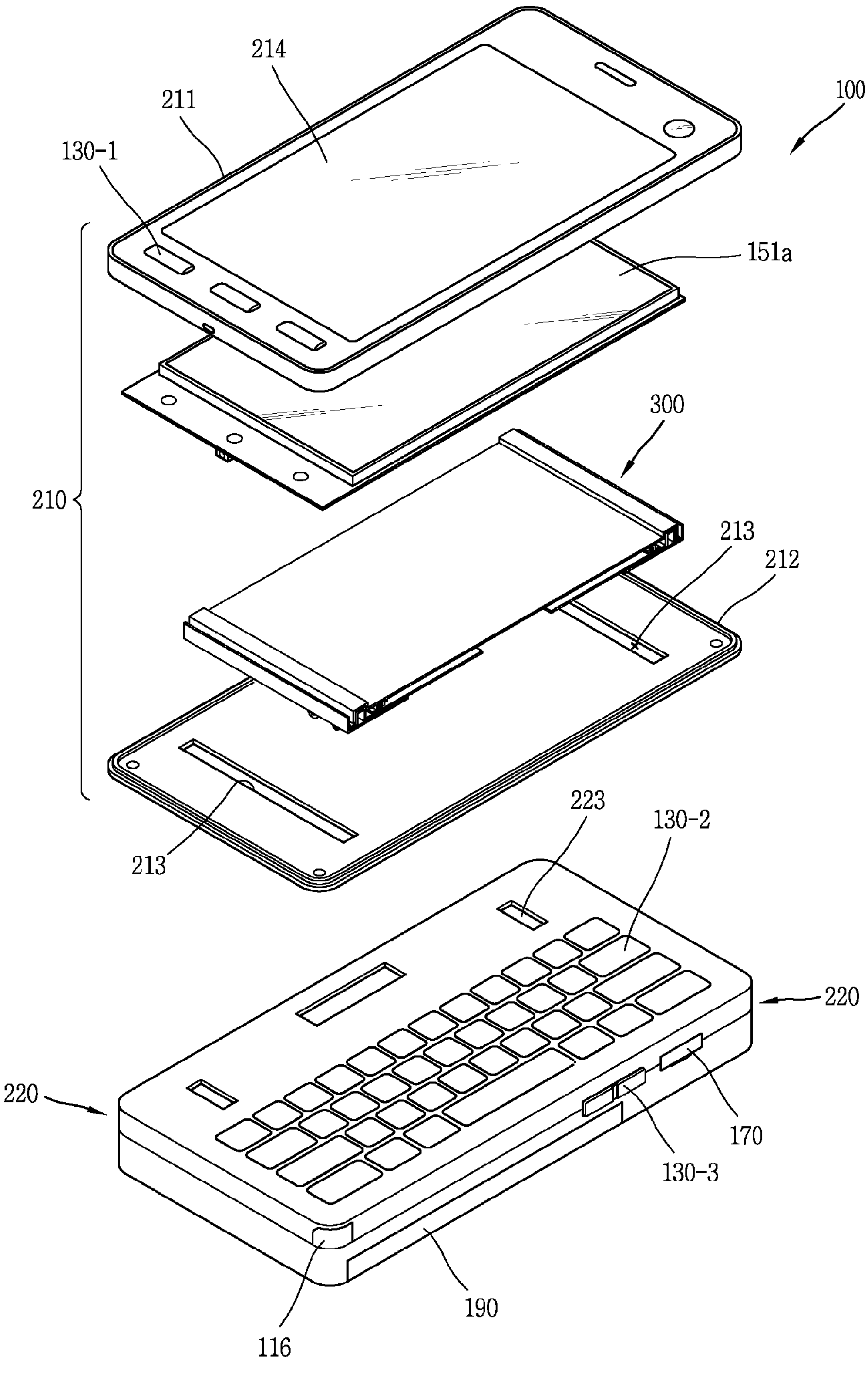
FIG. 4 is a disassembled perspective view of a mobile terminal in accordance with one embodiment of the present invention.

Referring to FIG. 4, the upper body 210 includes an upper case 211 and a lower case 212. Various electrical components may be disposed in a space formed between the upper case 211 and the lower case 212. The upper case 211 may have a transparent window 214, and a display module 151*a* for outputting visible information through the window 214 may be mounted at a rear side of the window 214.

A slide-tilt module for connecting the upper body 210 to the lower body 220 is provided between the upper body 210 and the lower body 220 so as to implement the closed configuration and the open configuration of the mobile terminal 100. The slide-tilt module may include a sliding unit 300 for connecting the upper and lower bodies 210 and 220 to be relatively slidable with respect to each other, and tilting units 350 located on both sides of a movable plate 320, shown in FIG. 5, and configured to tilt the upper body 210 to a preset angle from the lower body 220.

The sliding unit 300 may be disposed at a rear side of the display module 151*a*, and the tilting units 350 may be mounted to the sliding unit 300 so as to cooperate with the sliding unit 300. Each of the tilting units 350 may have an end portion connected to the lower body 220. The lower case 212 may be provided with through holes 213 through which the tilting units 350 are inserted. Mounting holes 223 into which the tilting units 350 are mounted may be formed at an upper surface of the lower body 220.

According to this embodiment of the present invention, the slide-tilt module is mounted between the upper case 211 and the lower case 212, and this structure can prevent the slide-tilt module from being exposed to the exterior of the mobile terminal 100. However, the present invention is not limited to this embodiment. Alternatively, the slide-tilt module may be mounted between the upper body 210 and the lower body 220, namely, at the lower surface of the upper body 210.

Figure 5:
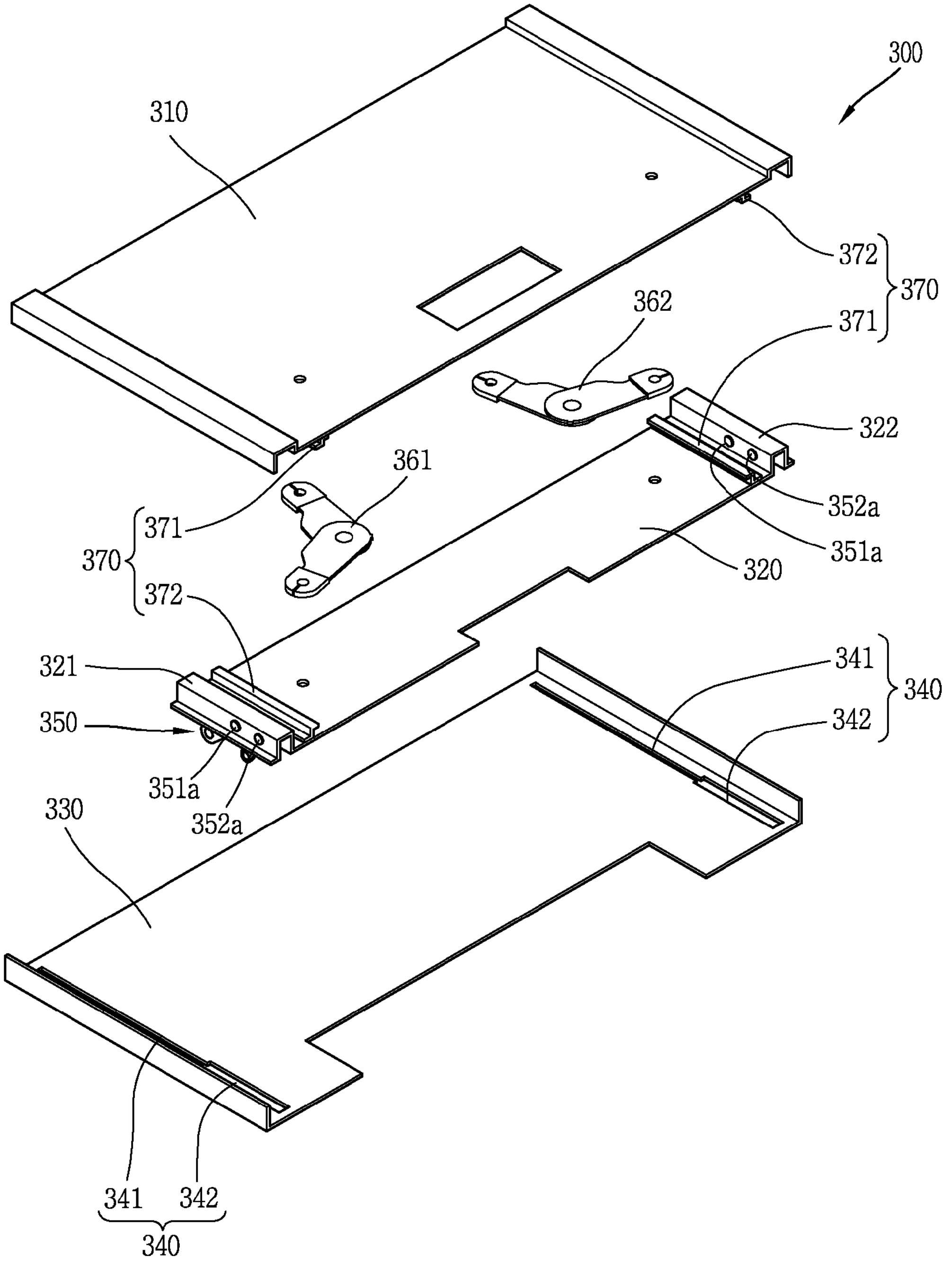
FIG. 5 is a disassembled perspective view of a slide-tilt module shown in FIG. 4.

Referring to FIG. 5, the slide module 300 includes a fixed plate 310, a movable plate 320 and a lower plate 330. The fixed plate 310 may be secured to the upper body 210, especially to the upper case 211. The display module 151*a* may be disposed at an upper side of the fixed plate 310. The movable plate 320 may be slidably coupled to a lower side of the fixed plate 310, and connected to the lower body 220 by the tilting units 350.

Guide units 370 for guiding the sliding motion between the fixed plate 310 and the movable plate 320 and spring modules 361 and 362 for supplying an elastic force to the fixed plate 310 and the movable plate 320 during the relative sliding motion between the fixed plate 310 and movable plate 320 may further be disposed between the fixed plate 310 and the movable plate 320. Each guide unit 370 may include a first guide member 371 formed at a lower surface of the fixed plate 310, and a second guide member 372 formed at an upper surface of the movable plate 320. The first and second guide members 371 and 372 may be slidably coupled to each other so as to guide the relative sliding between the fixed plate 310 and the movable plate 320.

The first and second guide members 371 and 372 may be configured in a form of a bent plate as shown in FIG. 5. An end portion of the first guide member 371 may be slidably inserted into a space formed between the second guide member 372 and the movable plate 320.

The spring modules 361 and 362 may have springs therein such that each of the springs can be compressed in response to the relative sliding between the fixed plate 310 and the movable plate 320 so as to generate an elastic force. Once the upper body 210 is slid from the lower body 220 within a predetermined section or distance in response to a user's manipulation, the upper body 210 may be thereafter automatically slid by the elastic force applied by the spring modules 361 and 362.

The lower plate 330 may be secured to a lower portion of the fixed plate 310 with a space having a preset interval between them. The movable plate 320 may be slidably mounted within the space formed between the fixed plate 310 and the lower plate 330. The lower plate 330 may be secured to the lower case 212 of the upper body 210. While the lower plate 330 is coupled to the fixed plate 310 in FIG. 5, the lower plate 330 and the fixed plate 310 may alternatively be integrated with each other as a single structure.

Figure 6:
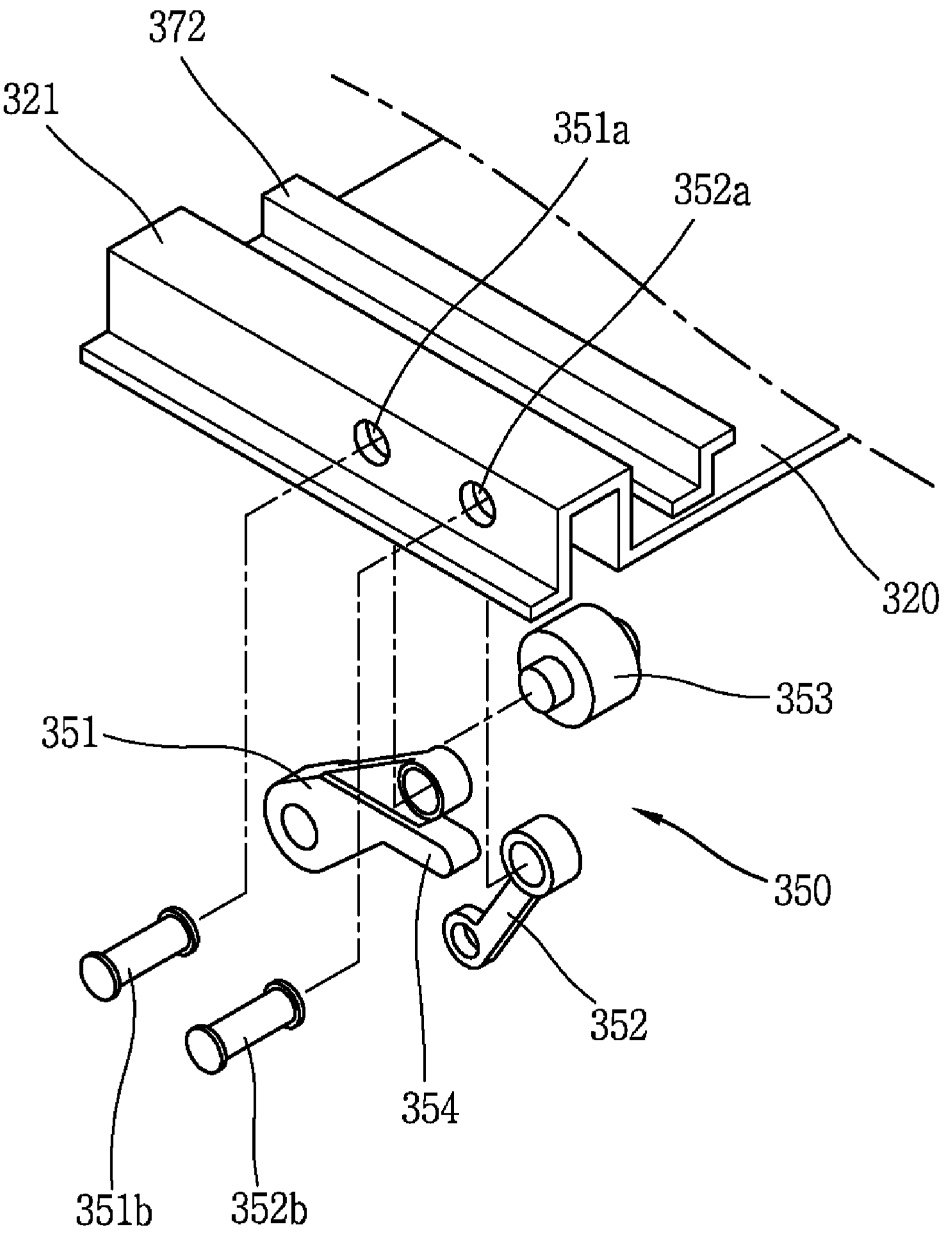
FIG. 6 is a perspective view showing a construction of a tilting unit shown in FIG. 5.

Referring to FIG. 6, each of the tilting units 350 includes a first link member 351, a second link member 352 and a rotational force providing portion 353. The first link member 351 may have one end rotatably coupled to the movable plate 320 and the other end rotatably coupled to the lower body 220. The other end of the first link member 351 may be connected to a portion adjacent to an end of the lower body 220.

A stopping portion 354 may protrude from one area of the first link member 351. Alternatively, the stopping portion 354 may be formed at a central area of the first link member 351, and be thicker than an upper part of the first link member 351.

The second link member 352 may be shorter than the first link member 351 and disposed at a position spaced from the first link member 351 by a preset interval. One end of the second link member 352 may be rotatably connected to the movable plate 320 and the other end of the second link member 352 may be rotatably connected to the lower body 220.

The rotational force providing portion 353 may be configured to provide a rotational force to either the first or second link member 351 or 352. According to this embodiment, the rotational force providing portion 353 is mounted between the other end of the first link member 351 and the lower body 220 so as to apply the rotational force to the first link member 351. Alternatively, the rotational force providing portion 353 may be configured as a torsion spring module which generates torque by means of a torsion spring provided therein.

Mounting portions 321 and 322 may protrude upwardly from both sides of the movable plate 320. The mounting portions 321 and 322 may be formed by bending both sides of the movable plate 320 and each of the mounting portions 321 and 322 may be provided with a space for mounting the corresponding tilting unit 350 therein. One end of each of the first and second link members 351 and 352 may be located in the corresponding mounting portions 321 and 322.

Still referring to FIG. 6, coupling holes 351*a* and 352*a* may be formed at a side surface of each mounting portion 321 and 322, and rotation pins 351*b* and 352*b* may be inserted through one end of the first and second link members 351 and 352 so as to be connected to the coupling holes 351*a* and 352*a*.

Referring back to FIG. 5, the sliding unit 300 may be provided with section defining portions 340. Each of the section defining portions 340 defines a “first section” in which the operation of the tilting unit 350 is restricted during the sliding of the upper body 210 and a “second section” in which the restricted operation of the tilting unit 350 is released such that the upper body 210 is tilted and slid. The tilting and the sliding of the upper body 210 may occur concurrently at one point during the operation in the second section.

In accordance with this embodiment, the section defining portions 340 are formed at the lower plate 330 of the slide module 300. Each of the section defining portions 340 may be configured to stop a part of the corresponding tilting unit 350 within the first section of the lower plate 330 and to release the stopped tilting unit 350 within the second section of the lower plate 330.

Each of the section defining portions 340 may be provided with a first slot 341 and a second slot 342 formed at the lower plate 330 to define the first section and the second section, respectively. The first and second slots 341 and 342 may be formed along the sliding direction of the upper body 210. One end of the first and second link members 351 and 352 may be coupled to the movable plate 320 through the first and second slots 341 and 342 at a lower side of the lower plate 330.

The first and second link members 351 and 352 may be configured to relatively slide along the first and second slots 341 and 342. Through holes 213 may be formed at the lower case 212 at positions aligned with the first and second slots 341 and 342 as shown in FIG. 4. The first slot 341 may have a width narrower than a thickness of the stopping portion 354 of the first link member 351 such that the stopping portion 354 can be stopped at a peripheral area thereof within the first section. The second slot 342 may extend from the first slot 341 to have a widened width that is wider than the thickness of the stopping portion 354 such that the stopping portion 354 can be released within the second section.

FIGS. 7A to 7D illustrate operation of the mobile terminal 100 in accordance with one embodiment of the present invention and sequentially show a process in which the mobile terminal 100 is converted from the closed configuration into the open configuration.

Figure 7A:
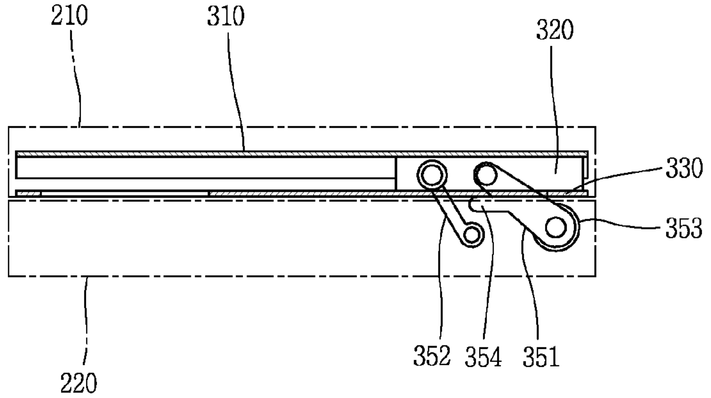
FIGS. 7A to 7D are sectional views illustrating operational steps of a mobile terminal in accordance with one embodiment of the present invention.

FIG. 7A shows the closed state of the mobile terminal 100. In the closed state, the first and second link members 351 and 352 are inclined at a preset angle to a horizontal plane. The rotational force providing portion 353 provides the rotational force in a direction that the first link member 351 is raised, but the rotation of the first link member 351 may be restricted due to the stopping portion 354 being locked at the lower plate 330.

Figure 7B:
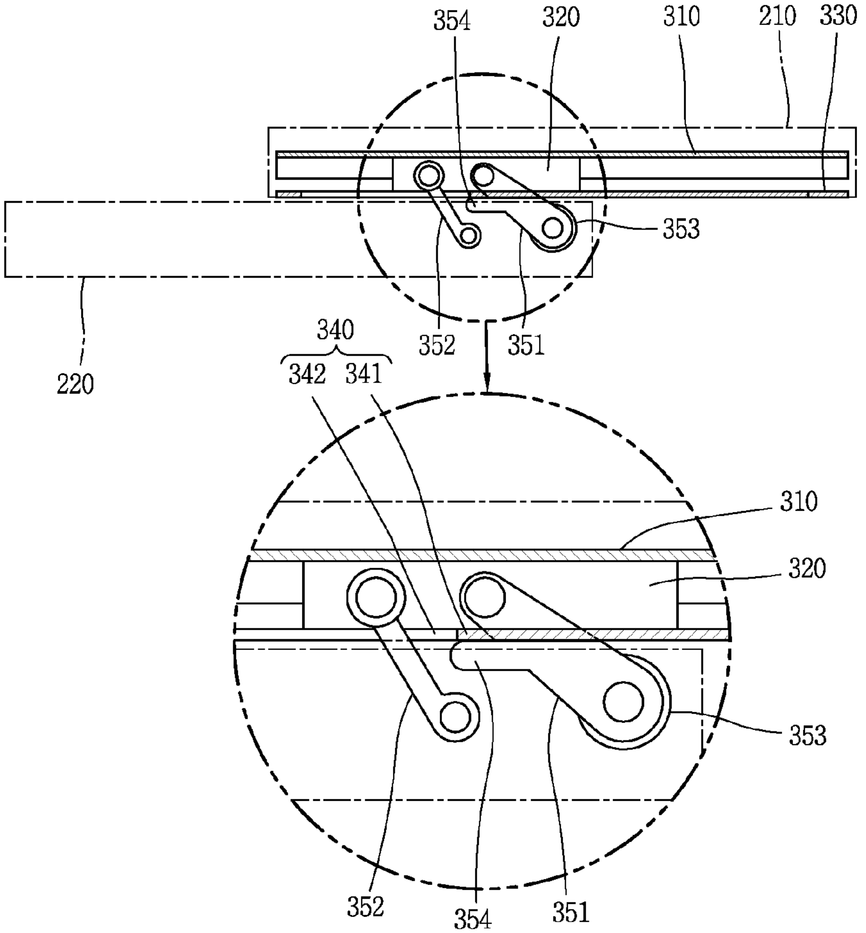

As shown in FIG. 7B, a section in which the upper body 210 is moved only by sliding motion is referred to as the “first section.” The fixed plate 310 and the lower plate 330 are slidable with respect to the movable plate 320 within the first section. In the first section, the first and second link members 351 and 352 are located at the first slot 341, and the stopping portion 354 of the first link member 351 remains locked at the lower plate 330. Accordingly, the upper body 210 performs only the sliding motion within the first section. Once the upper body 210 passes a dead point of the spring modules 361 and 362 within the first section, the upper body 210 is automatically moved or slid.

Figure 7C:
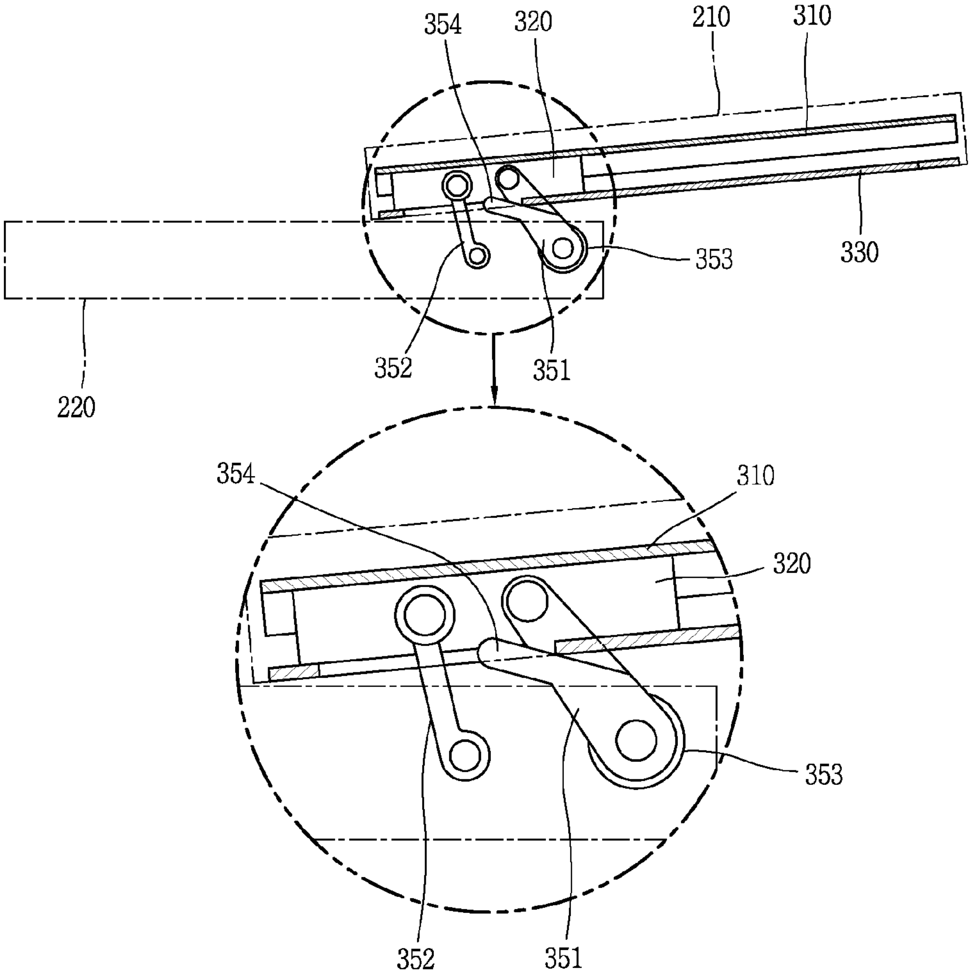

As shown in FIG. 7C, if the upper body 210 is slid such that the stopping portion 354 of the first link member 351 is advanced into the second slot 342, then the first link member 351 is released from the restricted or locked state. Accordingly, the first and second link members 351 and 352 start to be rotated by the rotational force provided by the rotation force providing portion 353.

As the first and second link members 351 and 352 are rotated in a direction of being raised, one end of the movable plate 320 is lowered and the other end of the movable plate 320 is lifted, thus tilting the movable plate 320. Consequently, the upper body 210 is tilted to a preset angle with respect to the lower body 220.

Figure 7D:
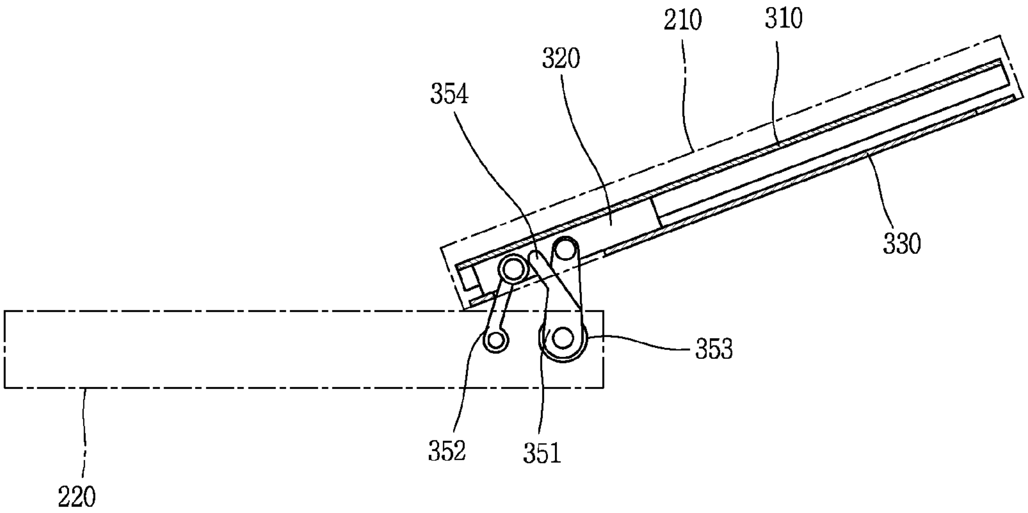

A section in which the rotation of the first and second link members 351 and 352 starts and the rotation is completed is referred to as the “second section.” Sliding and tilting operations of the upper body 210 may be simultaneously executed within the second section. The sliding and tilting operations of the upper body 210 within the second section may be automatically achieved by an elastic force provided by the spring modules 361 and 362 and the rotational force providing portion 353. Thus, as the upper body 210 is continuously slid and tilted within the second section, the mobile terminal 100 is converted into the open state as shown in FIG. 7D.

The conversion operation from the open configuration into the closed configuration of the mobile terminal 100 or closing operation may be achieved in the reverse order of the above described opening operation. The upper body 210 is slid as soon as being rotated within the second section in an opposite direction to the tilting direction, and semi-automatically slid within the first section after the dead point of the spring module 361 and 362.

Figure 8:
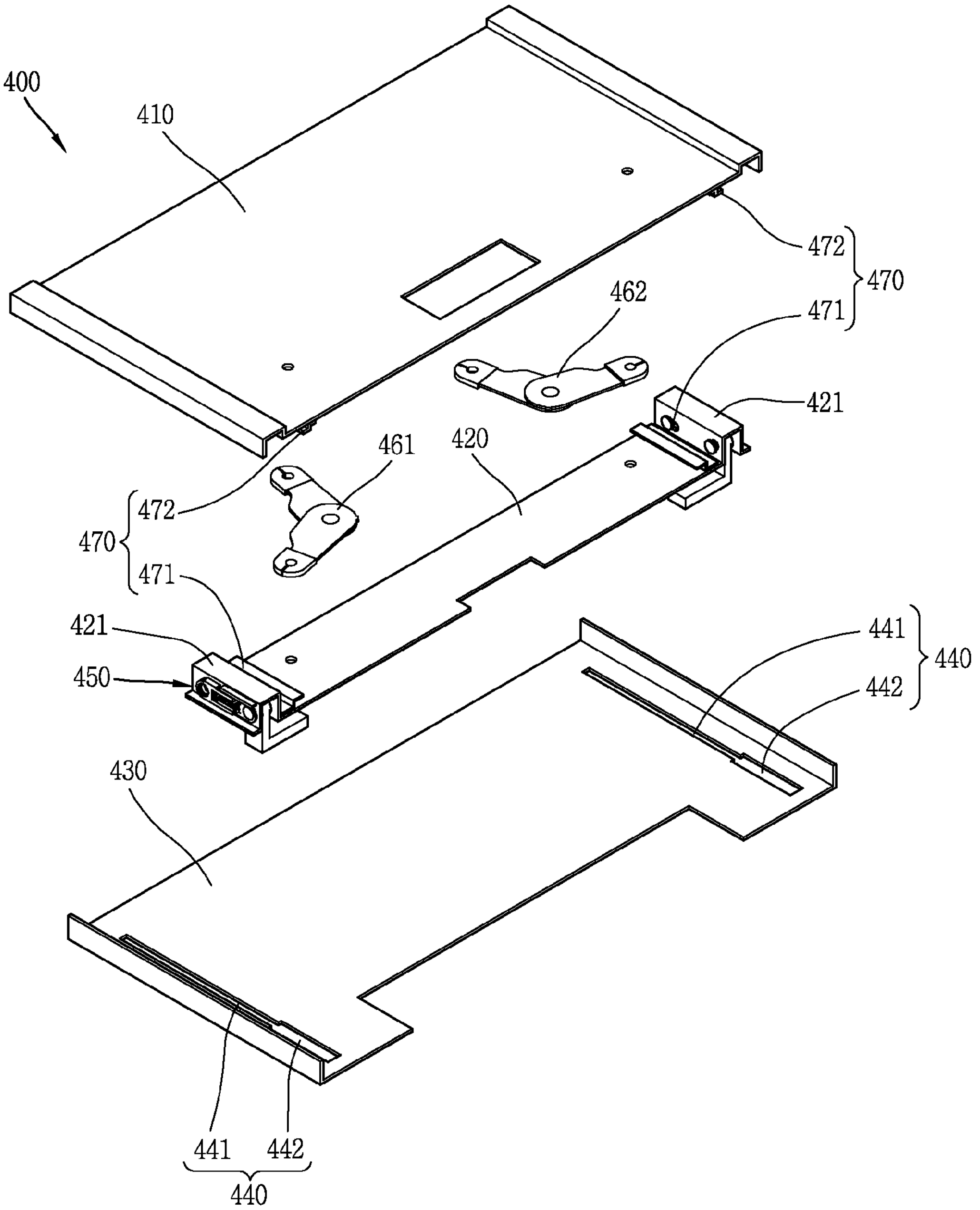
FIG. 8 is a disassembled perspective view showing a mobile terminal in accordance with another embodiment of the present invention.
Figure 9:
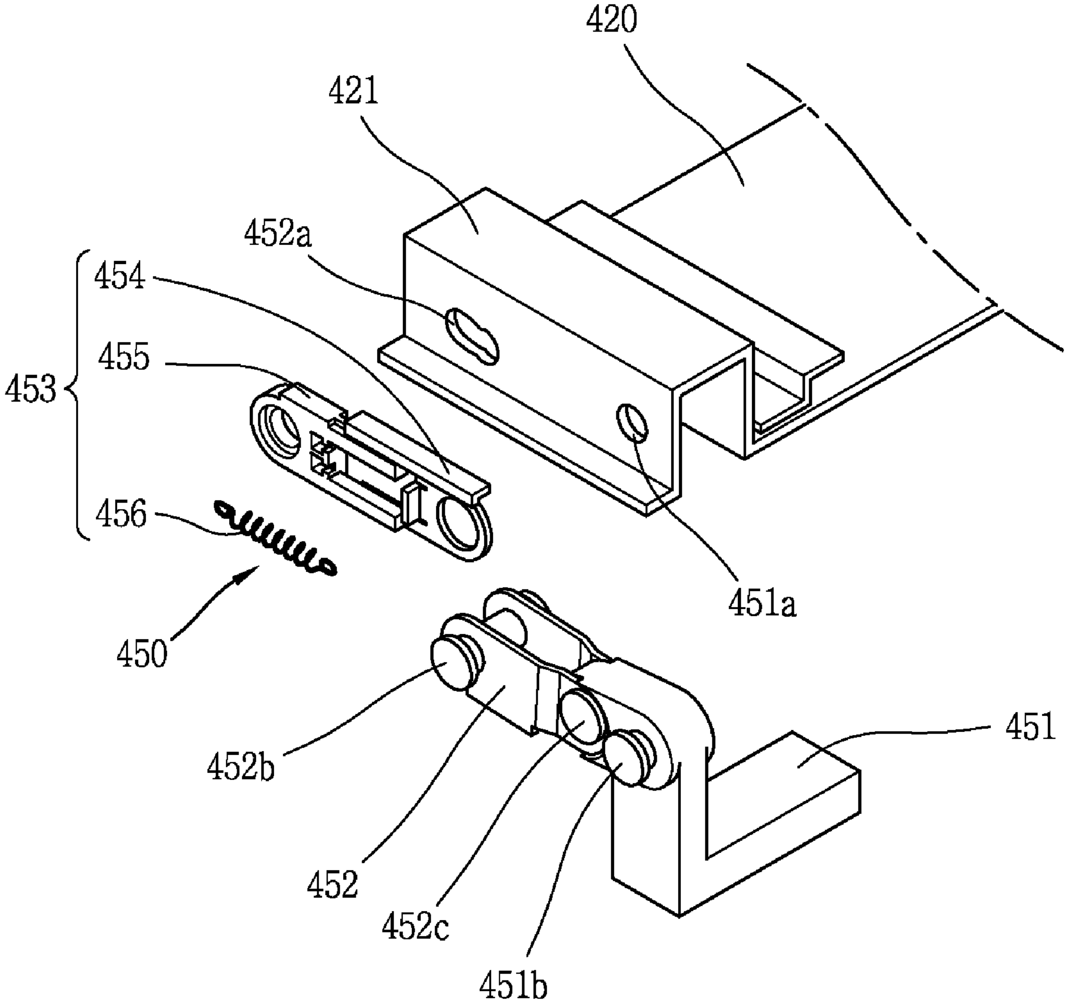
FIG. 9 is a disassembled perspective view of a slide-tilt module shown in FIG. 8.

FIGS. 8 and 9 show a slide-tilt module in accordance with another embodiment of the present invention. This embodiment has the same or similar configuration to that of the previously described embodiment except for the tilting units 350, and thus, the description of the configuration that is same as or similar to the previous embodiment will be omitted.

In this embodiment, a sliding unit 400 may be mounted between the upper case 211 and the lower case 212 of the upper body 210, and include a fixed plate 410, a movable plate 420 and a lower plate 430 similar to the previously described embodiment. In FIG. 8, the like reference numerals as those used in the previous embodiment will denote the like components as in the previous embodiment.

Referring to FIG. 9, each of the tilting units 450 includes a fixed member 451, a rotation member 452 and a rotational force providing portion 453. The fixed member 451 is secured with the lower body 220 at its one end and extends from the secured portion toward the movable plate 420 by being bent. The bent portion of the fixed member 451 is rotatably coupled to the movable plate 420.

The rotation member 452 is rotatably coupled to the fixed member 451 at one end and rotatably coupled to the movable plate 420 at the other end. The rotation member 452 may be thicker than the extending portion of the fixed member 451. The rotation member 452 may be rotatably coupled to an end portion of the fixed member 451. A rotation point between the rotation member 452 and the fixed member 451 is referred to as a "first rotation point" and a rotation point between the rotation member 452 and the movable plate 420 is referred to as a "second rotation point."

The end portion of the fixed member 451 and the rotation member 452 are disposed inside a corresponding mounting portion 421 of the movable plate 420. A first coupling hole 451*a* and a second coupling hole 452*a* may be formed at a side surface of the mounting portion 421.

First and second rotation pins 451*b* and 452*b* may be inserted through the fixed member 451 and the rotation member 452, respectively, and connected to the first coupling hole 451*a* and the second coupling hole 452*a*. The second coupling hole 452*a* may be formed such that the second rotation pin 452*b* is linearly movable, and thus, the second rotation point is linearly movable.

The rotational force providing portion 453 is configured to provide a rotational force to the rotation member 452. The rotational force providing portion 453 may be mounted at the side surface of the mounting portion 421 formed at the movable plate 420 and applies torque to the first rotation point. Further, the rotational force providing portion 453 may include a first rod 454, a second rod 455 and a spring 456.

One end of the first rod 454 is rotatably coupled to the first rotation point (first rotation pin 451*b*) and one end of the second rod 455 is rotatably coupled to the second rotation point (second rotation pin 452*b*). The spring 456 may be connected to the other ends of the first and second rods 454 and 455, and apply an elastic force between the first and second rotation points 451*b* and 452*b*. If the spring 456 is a compression spring, it may be connected to the first and second rods 454 and 455 in an extended state by a preset length.

The fixed member 451 and the rotation member 452 may be eccentrically connected to each other. As the elastic force is applied to the first and second rotation points 451*b* and 452*b* in conjunction with the spring 456, a rotational force is applied to the rotation member 452.

Referring back to FIG. 8, the sliding unit 400 may be provided with section defining portions 440 on the lower plate 430. The section defining portions 440 may be configured such that the tilting units 450 are partially locked at the lower plate 430 within the first sections, and the locked tilting units 450 are unlocked within the second sections. To define the first and second sections, each of the section defining portions 440 may include a first slot 441 and a second slot 442.

The first and second slots 441 and 442 may be formed similar to the first and second slots 341 and 342 of the previously described embodiment as shown in FIG. 8. The extending portion of the fixed member 451 is inserted through the first and second slots 441 and 442 and the end portion of the fixed member 451 is connected to the movable plate 420. The fixed member 451 may be disposed to be slidable along the first and second slots 441 and 442.

The first slot 441 may have a width narrower than the thickness of the rotation member 452 such that the rotation member 452 is stopped at a peripheral area of the first slot 441 within the first section. The second slot 442 may extend from the first slot 441 to have an enlarged width that is greater than the thickness of the rotation member 452 such that the stopped rotation member 452 can be released at the second slot 442 within the second section.

Figure 10A:
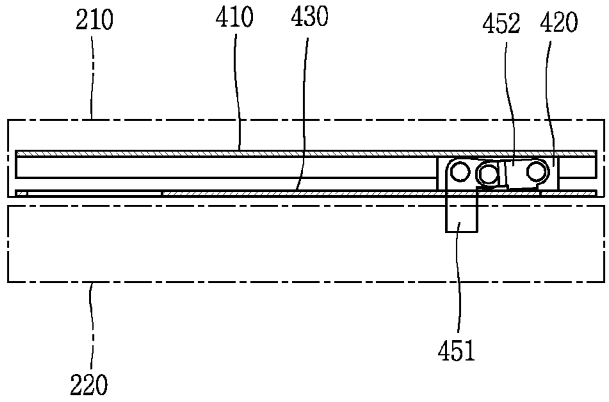
FIGS. 10A to 10D are sectional views illustrating operational steps of a mobile terminal in accordance with another embodiment of the present invention.

FIGS. 10A to 10D illustrate operation of the mobile terminal 100 in accordance with another embodiment of the present invention and sequentially show a process in which the mobile terminal 100 is converted from the closed configuration into the open configuration. In FIG. 10A, the mobile terminal 100 is in the closed state. The rotation member 452 is disposed in parallel to an upper surface of the lower body 220. When the upper body 210 and lower body 220 start relatively sliding from the closed state, the rotational force providing portion 453 applies a rotational force in a direction of the rotation member 452 being raised in the closed state, but the rotation of the rotation member 452 is restricted because a lower surface of the rotation member 452 is locked at the upper surface of the lower plate 430.

Figure 10B:
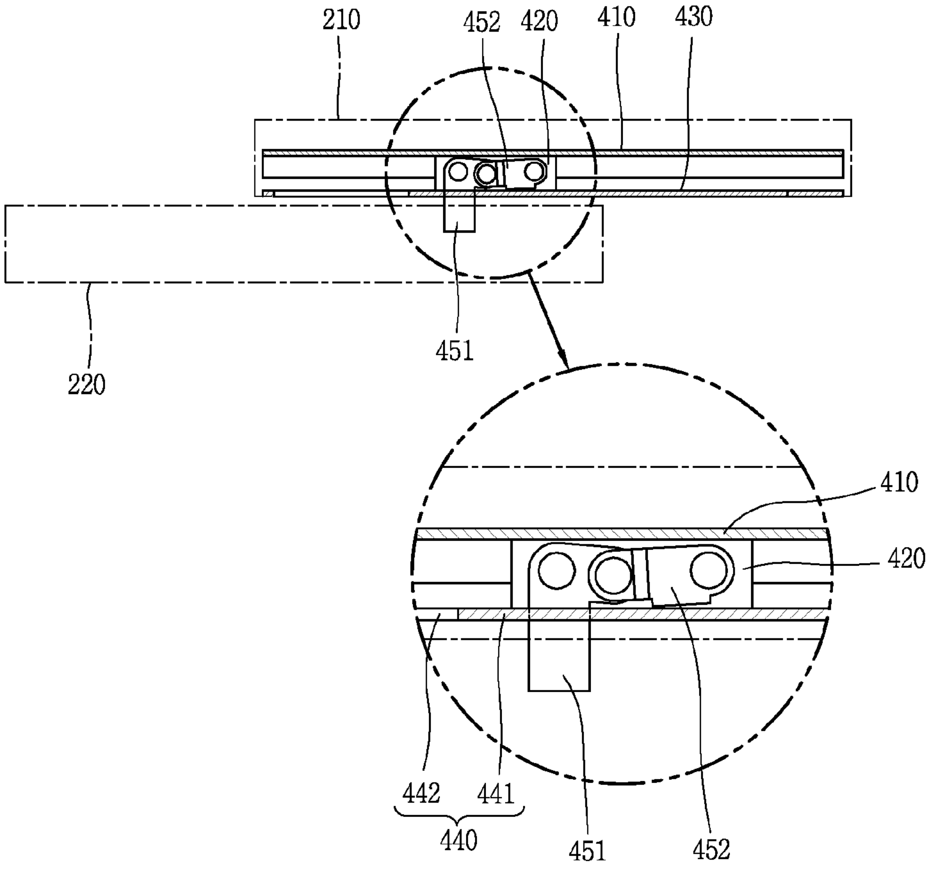

As shown in FIG. 10B, when the upper body 210 is slid within the first section, the fixed plate 410 and the lower plate 430 are relatively slid with respect to the movable plate 420. The fixed member 451 is positioned on the first slot 441 and the rotation member 452 is maintained in the locked state at the lower plate 430, thus the rotation member 452 is disposed in parallel to the upper surface of the lower body 220. Accordingly, the upper body 210 performs only a sliding motion within the first section.

Figure 10C:
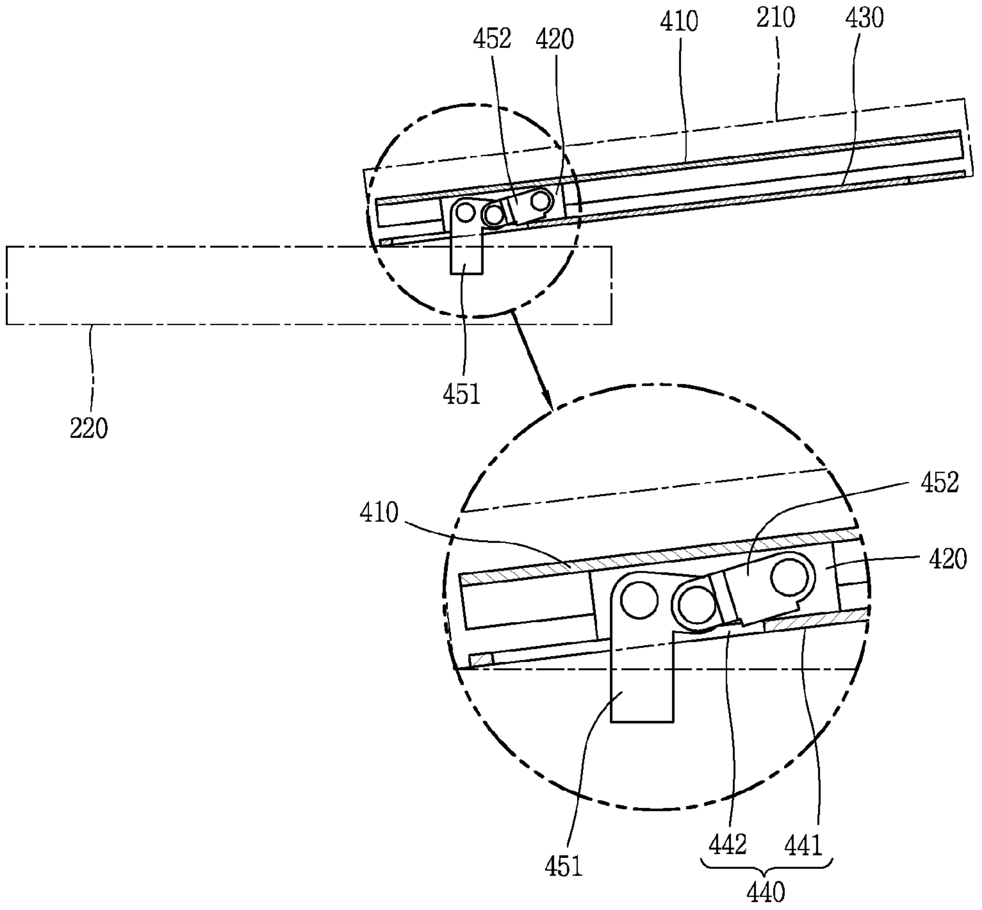

As shown in FIG. 10C, when the upper body 210 slid further and the rotation member 452 is advanced into the second slot 442, the rotation-restricted rotation member 452 may be released. Consequently, the rotation member 452 starts to rotate by the rotational force applied by the rotational force providing portion 453.

As the rotation member 452 is raised, the movable plate 420 is lifted up to a preset angle based upon the rotation point between rotation member 452 and the fixed member 451. The movable plate 420 is then tilted, resulting in tilting of the upper body 210 from the lower body 220 by the preset angle.

Figure 10D:
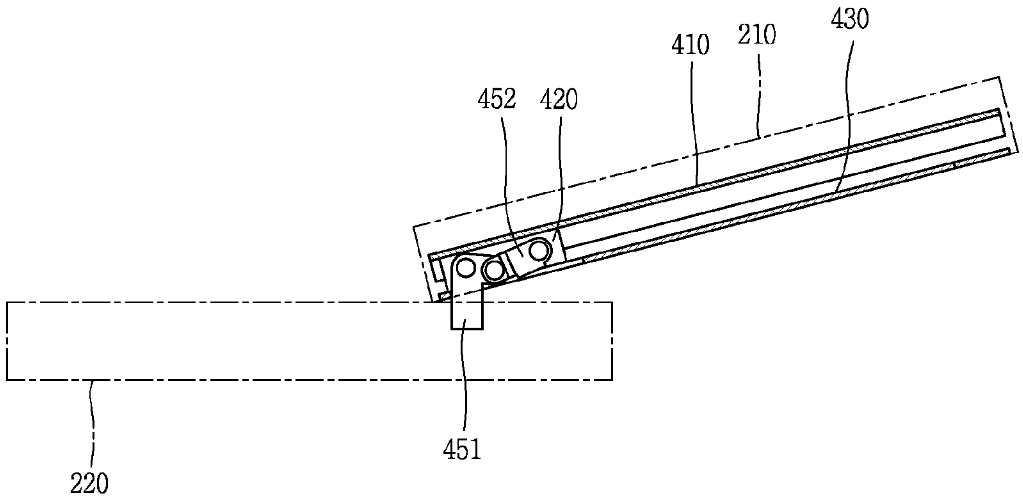

With such configuration, the upper body 210 may simultaneously perform the sliding motion and the tilting motion within the second section as similar to the previously described embodiment. As the sliding and tilting of the upper body 210 are continuously executed within the second section, the mobile terminal 100 is converted into the open configuration as shown in FIG. 10D.

The mobile terminal 100 according to the present invention may be converted into the open configuration by sequentially undergoing a first operation in which the upper body 210 is slid from the closed configuration and a second operation in which the upper body 210 is slid and tilted. The conversion from the closed configuration into the open configuration may be achieved semi-automatically by means of the spring modules 361, 362 or 461, 462 and the rotational force providing portion 353 or 453.

The structure of the present invention according to the above described embodiments, by restricting the operation of each tilting unit 350 or 450 within the first section and releasing the restricted operation of each tilting unit 350 or 250 within the second section, can minimize the movement of the upper body 210 in up and down directions within the first section, in order to provide enhanced stability for the sliding and tilting mechanism.

Figure 11:
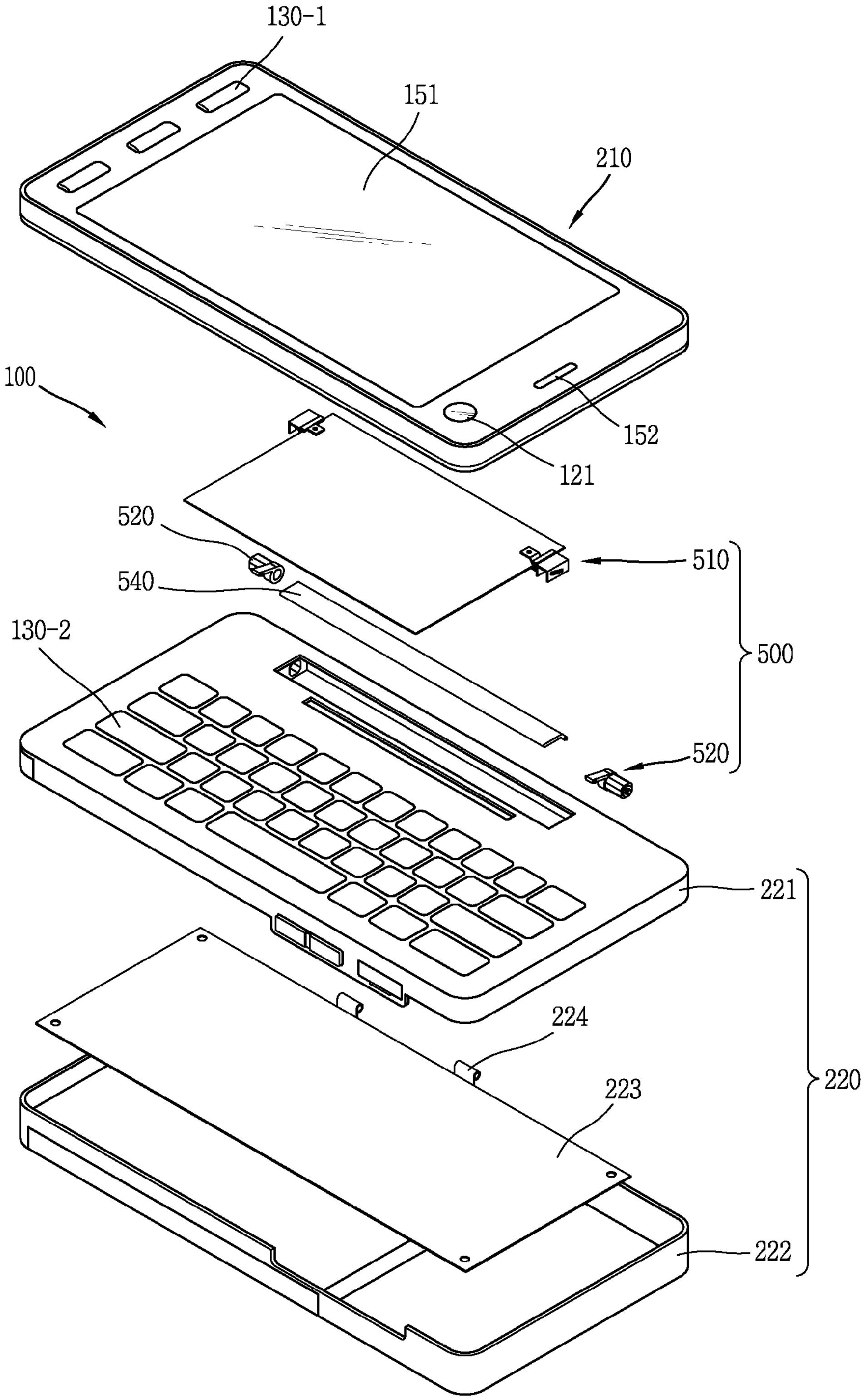
FIG. 11 is a disassembled perspective view of a mobile terminal in accordance with yet another embodiment of the present invention.
Figure 12:
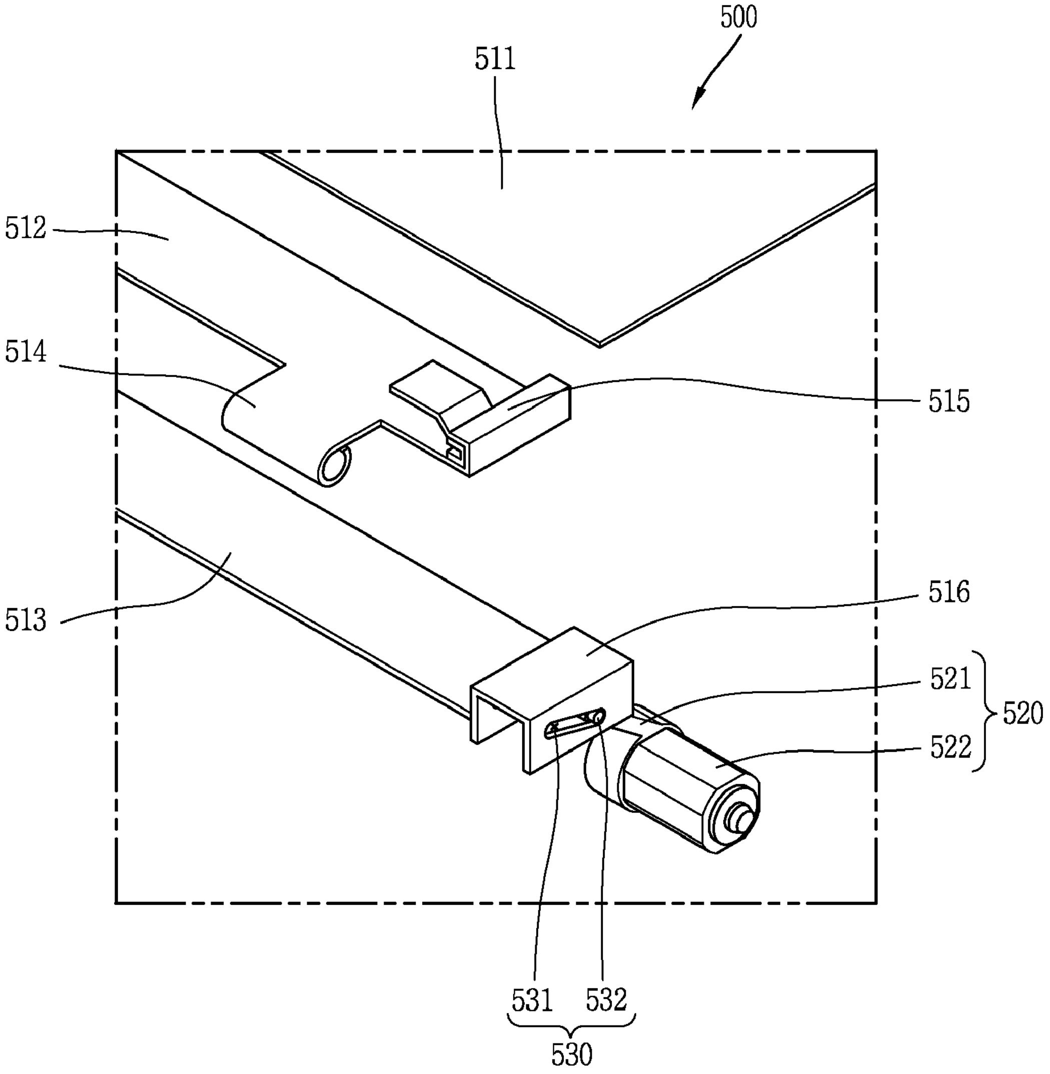
FIG. 12 is a partial disassembled perspective view of a slide-tilt module shown in FIG. 11.

FIG. 11 is a disassembled perspective view of a mobile terminal 100 in accordance with yet another embodiment of the present invention. FIG. 12 is a disassembled perspective view of a slide-tilt module 500 shown in FIG. 11.

As shown in FIG. 11, the slide-tilt module 500 is provided between the upper body 210 and the lower body 220. The slide-tilt module 500 may be configured such that the upper body 210 is slid within a preset section and thereafter slid and simultaneously tilted to a preset angle with respect to the lower body 220.

The slide-tilt module 500 includes a sliding unit 510 and tilting units 520 at the upper body 210. The sliding unit 510 has a structure configured for relative sliding of the upper and lower bodies 210 and 220. The sliding unit 510 may be rotatably connected to the lower body 220 by hinge units 514 as shown in FIG. 12.

The sliding unit 510 may include a fixed plate 511, a movable plate 512 and a supporting member 513. The fixed plate 511 is secured with the lower surface of the upper body 210 and the movable plate 512 is coupled to the fixed plate 511 to be relatively slidable therefrom. The movable plate 512 is provided with sliding rails 515 each having a groove and the fixed plate 511 is movable when side surfaces the fixed plate 511 are inserted into the sliding rails 515.

Spring modules for implementing a semi-automatic configuration upon a relative sliding between the upper and lower bodies 210 and 220 may be provided between the sliding rails 515 and the fixed plate 511. The spring modules may have the structure 361 and 362 or 461 and 462 as described in the previously described embodiments.

The movable plate 512 is provided with hinge units 514 rotatably coupled to the lower body 220. A supporting plate 223 is secured between the upper case 221 and the lower case 222 of the lower body 220, and hinge connection portions 224 are formed at the supporting plate 223. The hinge connection portions 224 may be exposed externally via through holes of the lower body 220. The hinge units 514 of the movable plate 512 may be hinge-connected to the hinge connection portions 224 via a structure such as pins or shafts.

The supporting member 513 is configured to support the movable plate 512 and to connect the movable plate 512 and the tilting units 520. The supporting member 513 is secured to the lower surface of the movable plate 512 and provided with mounting portions 516 into which the tilting units 520 are mounted.

The mounting portion 516 may be provided in pairs at both end portions of the supporting member 513. The mounting portions 516 may protrude upwardly from the supporting member 513 so as to be located at side surfaces of the respective sliding rails 515 formed on the movable plate 512. Each mounting portion 516 may be formed in a shape like '∩' such that a part of the corresponding tilting unit 520 is located therein. The mounting portion 516 may be formed by bending a metallic plate several times.

While the sliding unit 510 is illustrated as including the fixed plate 511, the movable plate 512 and the supporting member 513 according to FIG. 12, the sliding unit 510 may be formed with only the movable plate 512 and the supporting member 513 without the fixed plate 511. In this structure, the movable plate 512 may be slidably connected directly to the upper body 210 and a structure to be connected to the sliding rails 515 may be configured at the upper body 210. The movable plate 512 may be referred to as a "sliding member" for being slidably coupled to the upper body 210.

The tilting units 520 are connected to the lower body 220 so as to support the sliding unit 510. The tilting units 520 may be structured for applying a rotational force to the sliding unit 510 such that the sliding unit 510 can be rotated about the hinge units 514. Each of the tilting units 520 may include a link member 521 and a rotational force providing portion 522. The link member 521 may have one end connected to the corresponding mounting portion 516 so as to provide the rotational force to the supporting member 513.

The rotational force providing portion 522 may be connected to the other end of the corresponding link member 521 and provide a rotational force to the link member 521 such that the link member 521 can be rotated about the other end thereof. The rotational force applying unit 522 may be implemented as a torsion spring module having a torsion spring therein so as to generate torque. Both ends of the rotational force providing portion 522 may be connected to the lower body 220 and the link member 521, respectively.

As the rotational force providing portion 522 generates the torque, the link member 521 is rotated. The link member 521 in turn applies a rotational force generated by its rotation to the supporting member 513 such that the supporting member 513 can be tilted.

Guide units 530 for guiding the tilting operation of the supporting member 513 may be provided between the link member 521 and the mounting portion 516. Each of the guide units 530 may include a guide slot 531 formed at the mounting portion 516 and a guide protrusion 532 formed at the link member 521.

The guide protrusion 532 may be inserted into the guide slot 531 and move along the guide slot 531 responsive to the rotation of the link member 521. The guide protrusion 532 may serve to transfer the rotational force of the link member 521 to the supporting member 513. One direction of the guide slot 531 may be a lengthwise direction thereof and the lengthwise direction of the guide slot 531 may be inclined to a preset angle with respect to the horizontal direction. The inclined angle of the lengthwise direction of the guide slot 531 may determine an angle to which the supporting member 513 is to be tilted.

The mobile terminal 100 may further include a cover unit 540 for covering a flexible printed circuit board (FPCB) for an electrical connection between the upper and lower bodies 210 and 220 when the upper body 210 is tilted. The FPCB may be disposed in a space formed between the upper body 210 and the lower body 220. The cover unit 540 may serve to shield the FPCB in the tilted configuration of the upper body 210.

In one aspect of the present invention, the cover unit 540 includes a cover 541 and a spring 542 (see FIGS. 13A-D). The cover 541 may be in a shape of a plate rotatably mounted to the lower body 220. The cover 541 may also be obscured by the upper body 210 in the closed configuration where the upper body 210 and the lower body 220 overlap each other. The spring 542 may be disposed between the cover 541 and the lower body 220, and supply an elastic force in a direction of the cover 541 being raised or lifted. The spring 542 may be implemented as a torsion spring disposed on a rotational shaft of the cover 541.

A rotational force may be applied to the cover 541 due to the elastic force generated by the spring 542. The rotation of the cover 541 may be restricted by the upper body 210 in the closed state. If the upper body 210 is tilted so as to be released from the restriction, the cover 541 is raised by the elastic force of the spring 542, which covers the FPCB with the cover 541.

FIGS. 13A to 13D illustrate operation of the mobile terminal 100 in accordance with yet another embodiment of the present invention and sequentially show a process in which the mobile terminal 100 is converted from the closed configuration into the open configuration.

Figure 13A:
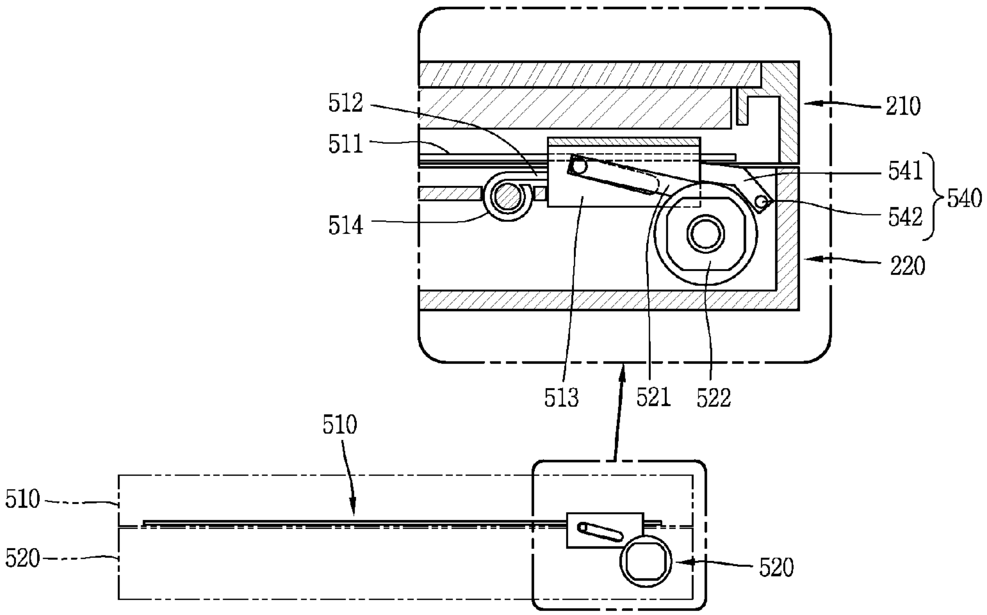
FIGS. 13A to 13D are sectional views illustrating operational steps of a mobile terminal in accordance with yet another embodiment of the present invention.

FIG. 13A shows the closed configuration of the mobile terminal 100. The link member 521 is laid on the lower body 220, being disposed almost in a horizontal direction. Although the rotational force providing portion 522 applies a rotational force to the link member 521 in a direction of the link member 521 being raised, since the upper and lower bodies 210 and 220 are surface-contacted with each other, the tilting of the upper body 210 is restricted.

Figure 13B:
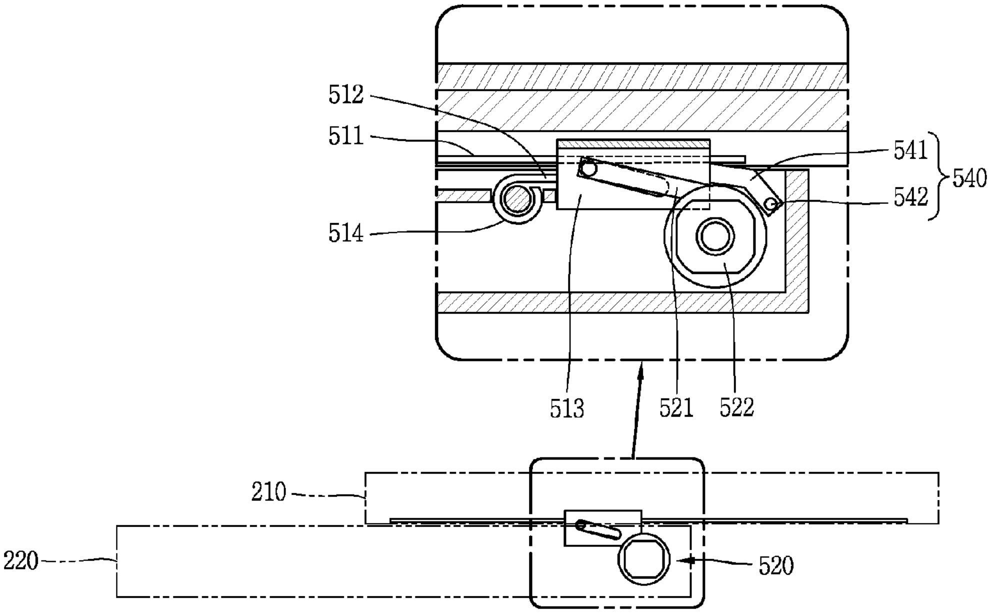

In the closed configuration, as the upper body 210 is pushed in a sliding direction, the upper body 210 may be relatively slid with respect to the lower body 220, as shown in FIG. 13B. A section from the closed configuration of FIG. 13A to the configuration shown in FIG. 13B may be referred to a first section, in which the upper body 210 is only slid but not tilted. The fixed plate 511 is relatively slid with respect to the movable plate 512 within the first section.

When the upper body 210 passes a dead point of the spring module within the first section, the upper body 210 is then automatically slid after the dead point. As the upper body 210 is slid over a preset section, a frictional area between the upper body 210 and the lower body 220 may be reduced, thus allowing the upper body 210 to be tilted by the hinge units 514.

Figure 13C:
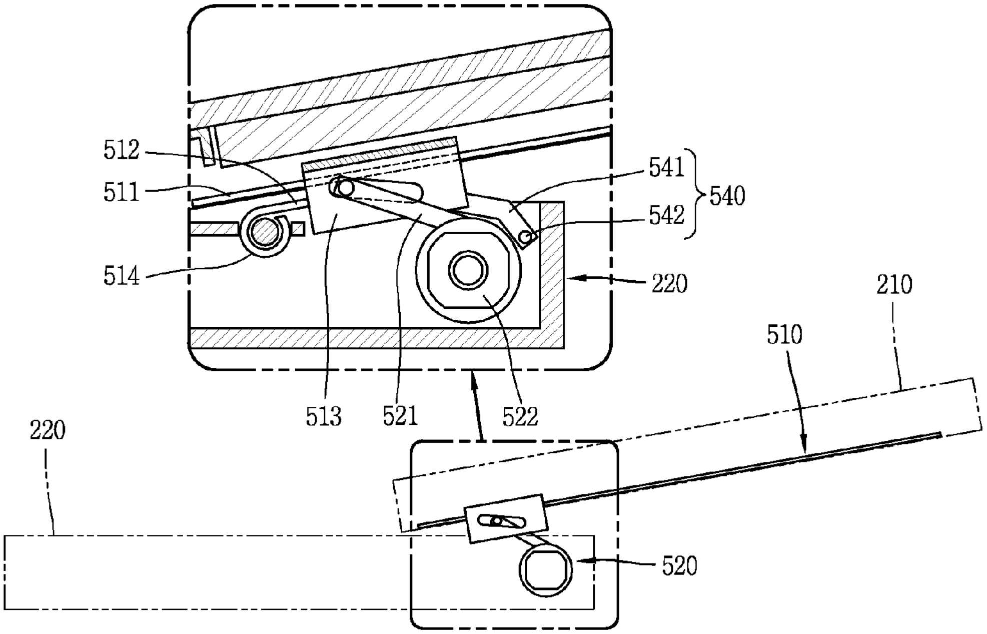

As shown in FIG. 13C, the link member 521 starts to rotate in a direction of being raised by the rotational force provided by the rotational force applying unit 522, and the guide protrusion 532 of the link member 521 is moved along the guide slot 531 of the supporting member 513, thereby allowing the tilting of the supporting member 513.

Consequently, the movable plate 512 supported by the supporting member 513 is tilted by being rotated according to the rotation of the hinge units 514, and the fixed plate 511 is tilted while also being slid on the movable plate 512. Accordingly, the upper body 210 is tilted while also being slid with respect to the lower body 220 after the first section. A section in which the tilting of the upper body 210 starts and is completed may be referred to as “second section.”

The sliding of the upper body 210 within the second section is automatically achieved by the elastic force generated by the spring module, and the tilting of the upper body 210 is automatically achieved by the rotational force provided by the rotational force providing portion 522. The cover 541, which has been restricted from being rotated by the upper body 210, is released within the second section, and the cover 541 is rotated by the rotational force applied by the spring 542 so as to be raised.

Figure 13D:
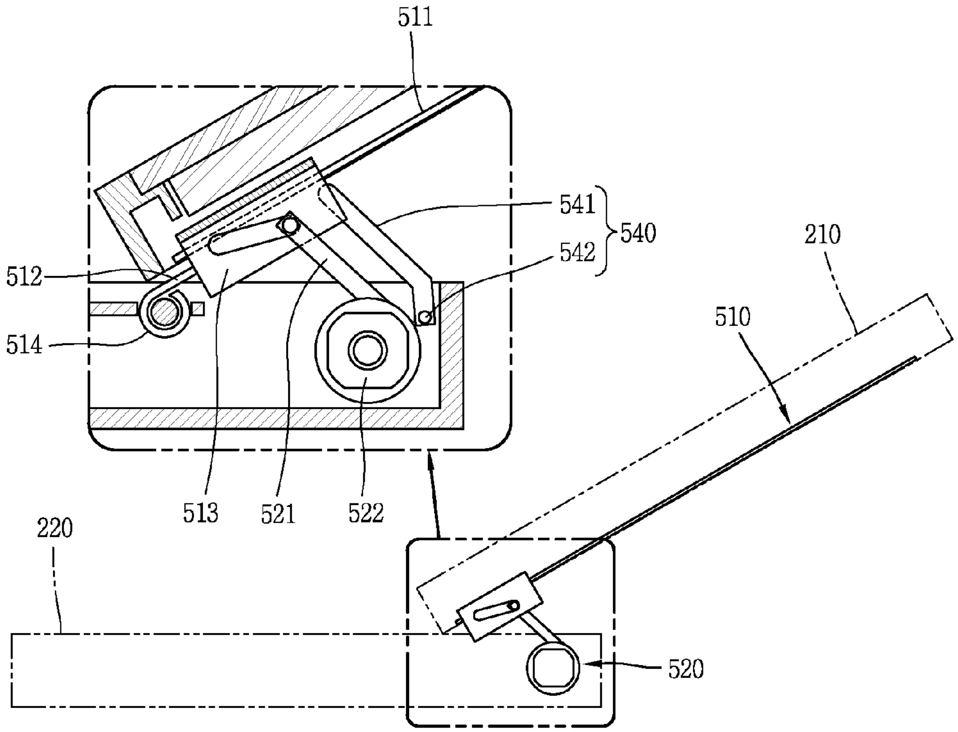

The continuous sliding and tilting of the upper body 210 within the second section allows the mobile terminal 100 to be converted into the completely open configuration as shown in FIG. 13D. The operation of converting the mobile terminal 100 from the open configuration into the closed configuration may be performed in the reverse order of the above described operation of converting from the closed configuration into the open configuration.

That is, when the upper body 210 is pushed to close the mobile terminal 100, the upper body 210 is laid down and slid simultaneously. In other words, the upper body 210 is slid while simultaneously being rotated within the second section in the opposite direction to the tilting direction, and then semi-automatically slid within the first section after the dead point of the spring module. The upper body 210 then pushes the cover 541 to be laid down within the second section.

Figure 14:
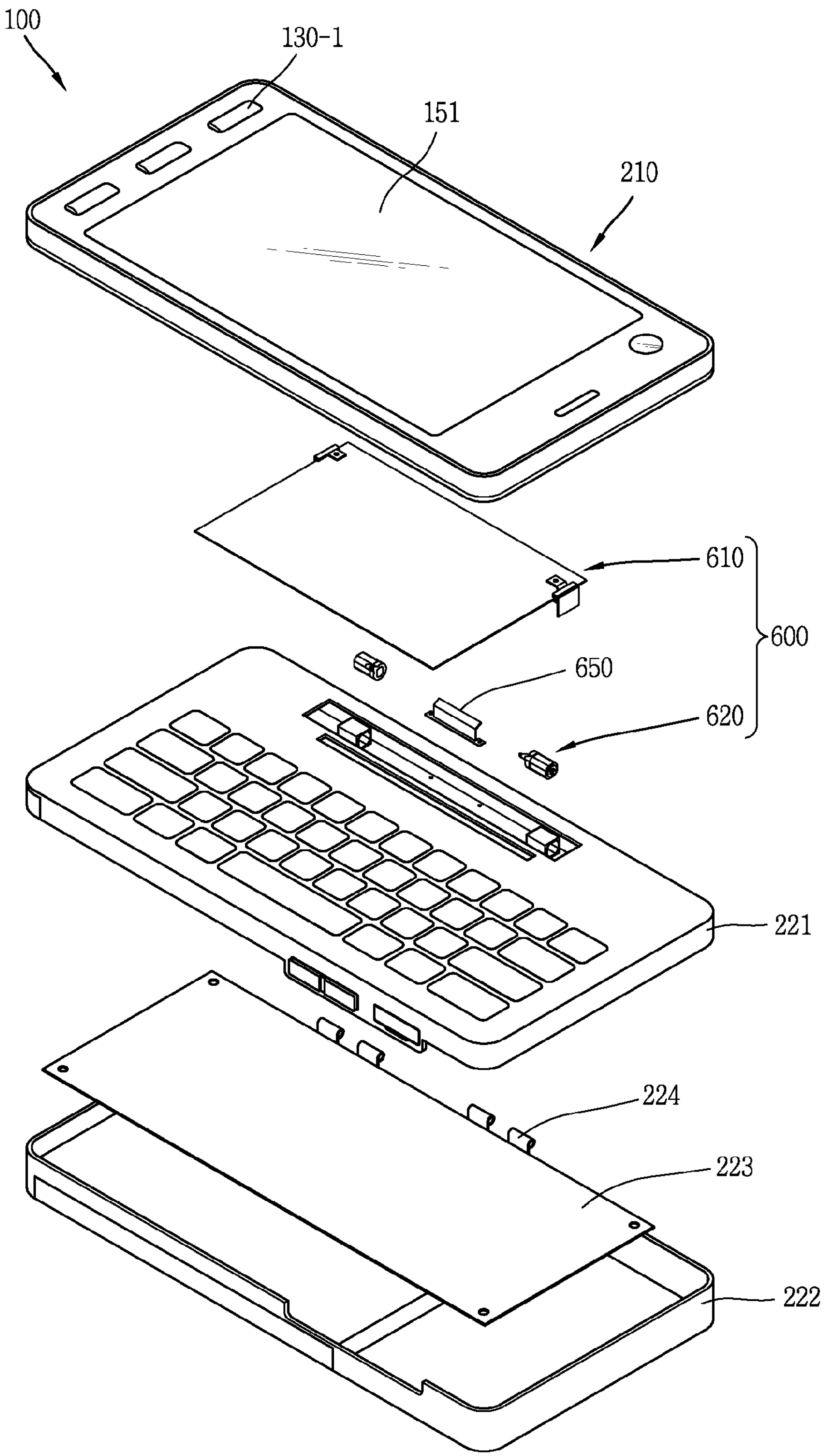
FIG. 14 is a disassembled perspective view of a mobile terminal in accordance with yet another embodiment of the present invention.
Figure 15:
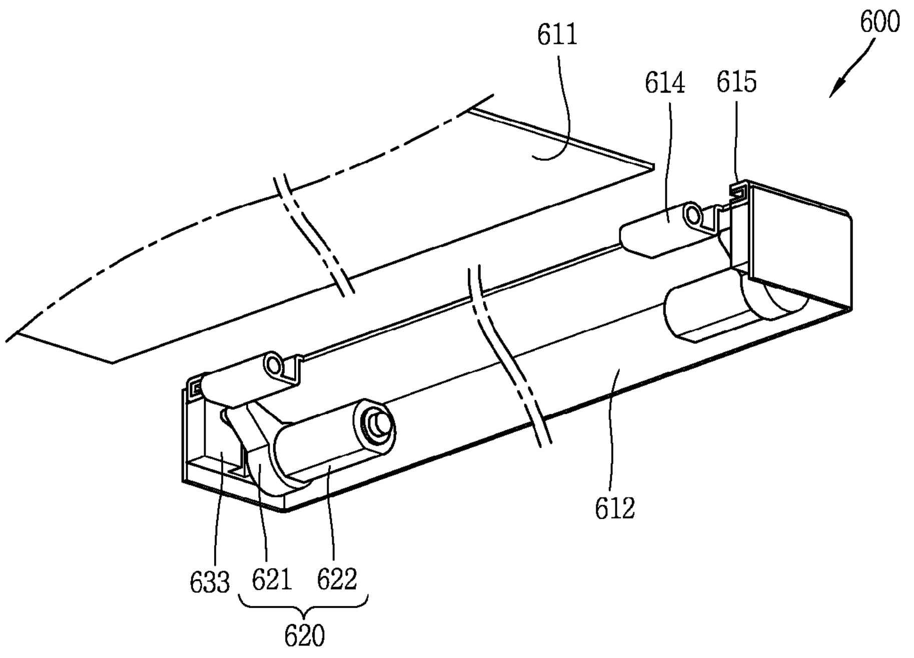
FIG. 15 is a disassembled perspective view of a slide-tilt module shown in FIG. 14.

FIG. 14 shows a mobile terminal 100 in accordance with yet another embodiment of the present invention, and FIG. 15 shows a disassembled perspective view of a slide-tilt module shown in FIG. 14. The present embodiment provides the same configuration as that of the previous embodiment except for the slide-tilt module, and employs the same reference numerals therefor. Hereinafter, the description of the configuration that are the same or similar to that of the previous embodiment will not be repeated.

A slide-tilt module 600 according to this embodiment includes a sliding unit 610 and tilting units 620. In this embodiment, the movable plate 512 and the supporting member 513 of the previous embodiment may be integrally formed. This structure is referred to as a slidable supporting member 612. The sliding unit 610 may include a fixed plate 611 and the slidable supporting member 612 slidably connected to the fixed plate 611.

The slidable supporting member 612 may be formed in a hexahedral shape having two open surfaces and provided with hinge units 614. The hinge units 614 may be connected to hinge connection portions 224 of the supporting plate 223 by hinges. The slidable supporting member 612 may be provided with sliding rails 615 by which the slidable supporting member 612 can be slidably connected to the fixed plate 611. Furthermore, an inner space of the slidable supporting member 612 may be provided with a mounting space for the tilting units 620.

Each of the tilting units 620 may include a link member 621 and a rotational force applying unit 622. The link member 621 may have one end connected to the slidable supporting member 612 so as to apply a rotational force to the slidable supporting member 612, and the rotational force applying unit 622 may be connected to the other end of the link member 621.

Guide members 633 may be mounted onto both inner side walls of the slidable supporting member 612. Each of the guide members 633 may be provided with a guide slot 631 and a guide protrusion 632 movably inserted into the guide slot 631 may be formed at an end portion of the link member 621, as shown in FIG. 16B. That is, the guide members 633 may have a structure similar to the mounting portion 516 of the previous embodiment in that the guide members 633 have the guide slot 631.

Figure 16A:
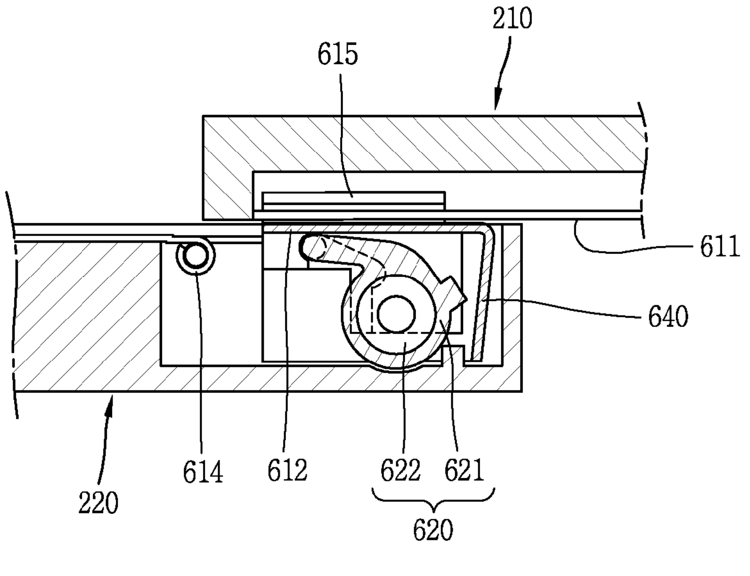
FIGS. 16A and 16B are sectional views illustrating operational steps of a mobile terminal in accordance with yet another embodiment of the present invention.
Figure 16B:
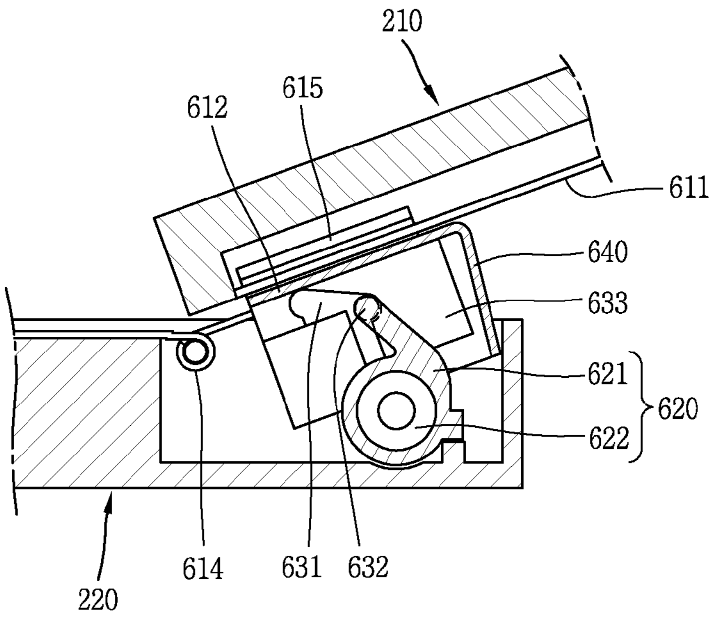

FIGS. 16A and 16B illustrate operation of the mobile terminal 100 in accordance with yet another embodiment of the present invention and sequentially show a process in which the mobile terminal 100 is converted into the open configuration. FIG. 16A shows a state in which the movement within the first section is completed, and FIG. 16B shows a state in which the movement within the second section is completed such that the mobile terminal 100 is converted into the open configuration.

The link member 621 is rotated by a rotational force provided by the rotational force applying unit 622. Accordingly, the slidable supporting member 612 is rotated about the hinge units 614 to be tilted. During this operation, since the fixed plate 611 is slid on the slidable supporting member 612, the sliding and tilting of the upper body 210 within the second section may be simultaneously performed.

In accordance with this embodiment, a cover unit 640 may be formed on the slidable supporting member 612 as shown in FIG. 16A. The cover unit 640 may extend from an end portion of the slidable supporting member 612 so as to define a side wall of the slidable supporting member 612. As such, this embodiment implements the movable plate 512, the supporting member 513 and the cover unit 540 of the previous embodiment as a single member, namely, the slidable supporting member 612, thereby achieving the slide-tilt module 600 having a simpler structure.

Figure 17:
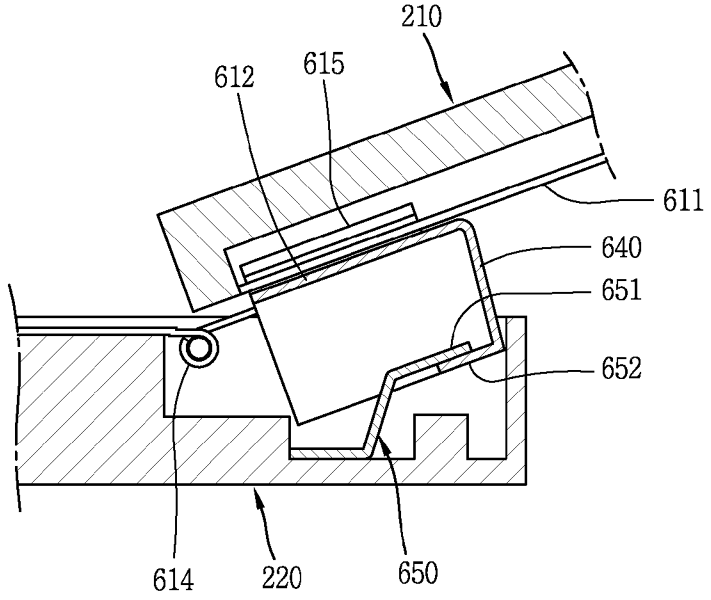
FIG. 17 is a sectional view of a stopper used for stopping tilting of an upper body of a mobile terminal in accordance with yet another embodiment of the present invention.

FIG. 17 shows a structure of a stopper for stopping the tilting of the upper body 210 upon the upper body 210 being tilted. In FIG. 17, the upper body 210 is shown to be in a completely tilted state.

According to the present embodiment, a stopper 650 may further be provided between the sliding unit 610 and the lower body 220. The stopper 650 may serve to restrict the rotation of the sliding unit 610 at a preset angle upon the upper body 210 being tilted.

The stopper 650 may be mounted at the lower body 220 and located between a pair of rotational force applying units 622. The stopper 650 and the sliding unit 610 may be provided with first and second stopping portions 651 and 652, respectively, to be stopped by each other.

The stopper 650 may be formed by being bent to have a preset angle from the upper surface of the lower body 220, and the first stopping portion 651 may be formed at an end portion of the stopper 650. The second stopping portion 652 may be formed at the slidable supporting member 612 or at the end portion of the cover unit 640 in an extended form.

The first stopping portion 651 may be located on a rotation path of the second stopping portion 652 such that the second stopping portion 652 is stopped by the first stopping portion 651 while the sliding unit 610 is rotated. Accordingly, the rotation of the upper body 210 can be restricted during the tilting of the upper body 210.

The structures of the slide-tilt modules according to the present invention can be implemented for an easy and smooth sliding and tilting mechanism of the mobile terminal 100. Further, an installation space of components for implementing the sliding and tilting mechanism can be reduced significantly. Furthermore, the tilting units for allowing the tilting operation are mounted at the outer periphery of the sliding unit, thereby resulting in reduction of thickness and size of the mobile terminal 100.

Figure 18:
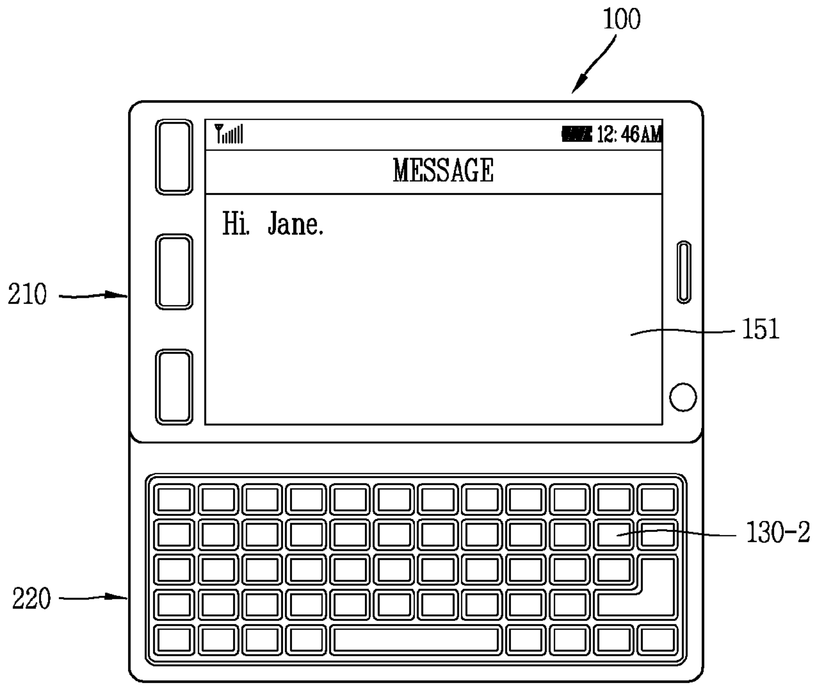
FIGS. 18 and 19 are planar views showing operations of a mobile terminal in accordance with an embodiment of the present invention in an open configuration.
Figure 19:
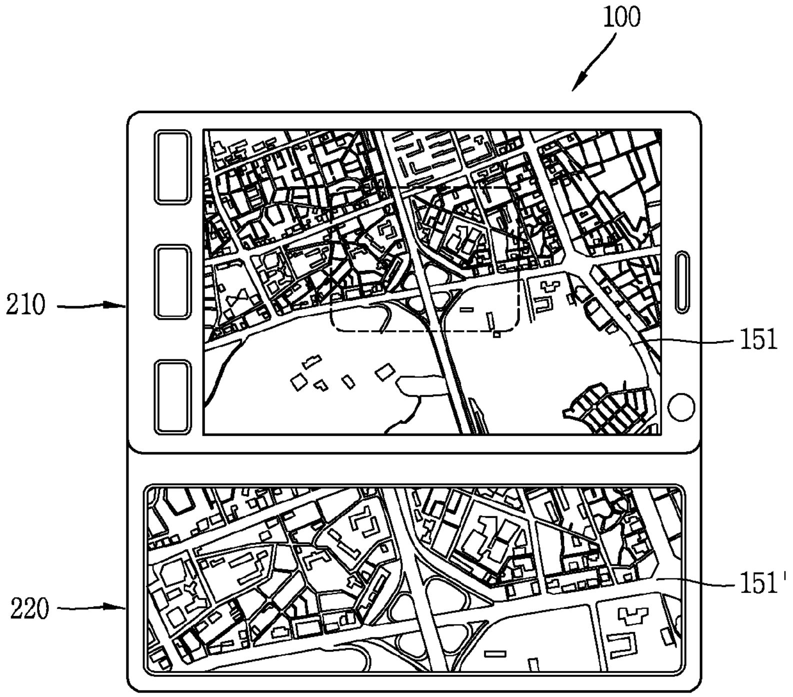

FIGS. 18 and 19 are planar views showing an en exemplary operation of the mobile terminal 100 in an open configuration.

FIG. 18 shows a QWERTY type keypad as one example of the user input unit 130-2 disposed at the lower body 220. For example, an input such as characters, numbers, and symbols, can be entered via the keypad or the user input unit 130-2 to compose a message.

The display unit 151 may be set such that its output direction can be converted in conjunction with the conversion of the mobile terminal 100 from the closed configuration to the open configuration and vice versa. Upon information being input via the user input unit 130-2, the corresponding information is output or displayed on an output window of the display unit 151. In the mobile terminal 100 according to the present disclosure, the display unit 151 is tilted to a preset angle in the open configuration to provide an optimal viewing angle to a user.

FIG. 19 shows another embodiment of the user input unit 130 disposed at the lower body 220. That is, a display unit 151' as a touch screen may be installed. In this case, the first display unit 151 of the upper body 210 and the second display unit 151' of the lower body 220 may be configured to output different visible information. Alternatively, the first and second display units 151 and 151' may be configured to output visible information associated with each other. By employing such a structure or configuration, the upper surface of the lower body 220 having a relatively wide space can be used as an installation space of a keypad, thereby enhancing a special utilization, such as disposing relatively many keys on the upper surface of the lower body 220 and increasing the size of the keys disposed.

In FIG. 19, the entire screen content or map is output on the first display unit 151, and a detailed screen for a selected portion of the entire screen is output on the second display unit 151'. If at least one of the first and second display units 151 and 151' is implemented as a touch screen, it may also be possible that one display unit is touched to control the other display unit.

For example, a touch-inputtable soft key or a writing region on which contents can be input may be output on the second display unit 151', and contents entered via the second display unit 151' may be displayed on the first display unit 151. That is, output information on the first display unit 151 can be controlled by the touch input on the second display unit 151'.

According to this structure, two display units 151 and 151' having large screens may be installed in the mobile terminal 100. This structure allows a user to use the two display units 151 and 151' at the same time.

As described herein, the present disclosure facilitates an easy and smooth sliding and tilting mechanism to be implemented in the mobile terminal to convert it into the open configuration by a first operation in which the upper body is slid from the closed configuration and a second operation in which the upper body is slid and tilted with respect to the lower body.

Furthermore, the structure of the slide-tilt module, in which the operation of the tilting unit is restricted within a first section and the restricted operation of the upper body is released within a second section, can minimize the movement of the upper body in the closed configuration and the first section, thereby providing a more stable and reliable sliding and tilting mechanism.

Moreover, the thickness and size of the mobile terminal can be reduced by mounting tilting units for facilitating the tilting operation at an outer periphery of the sliding unit, and cover units are utilized to prevent the external exposure of an FPCB.

The aforesaid configurations and methods for the mobile terminal are not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims Therefore all changes and modifications that fall within the metes and bounds of the claims, or equivalents of such metes and bounds are therefore intended to be embraced by the appended claims.

What is claimed is:

1. A mobile terminal, comprising:

a first body;

a second body; and a slide-tilt module comprising:

- a sliding unit configured to slidably connect the first body to the second body such that the first body slides relative to the second body within a first section;
- a tilting unit configured to tilt the first body to a preset angle relative to the second body within a second section;
- a rotational force providing portion configured to provide a rotational force to the tilting unit; and
- a section defining portion formed at the sliding unit to define the first section and the second section, the section defining portion having a first slot and a second slot connected to the first slot, wherein:
the second slot has a width that is wider than a width of the first slot;
the second section is defined by part of the tilting unit that is inserted into the second slot;
the tilting unit is inactive and the first body is slid within the first section; and
the tilting unit is activated within the second section such that the first body is tilted by the rotational force.

2. The terminal of claim 1, wherein the tilting unit is mounted to the sliding unit.

3. The terminal of claim 2, wherein the sliding unit comprises:
a fixed plate secured to the first body;
a movable plate slidably coupled to a lower portion of the fixed plate and connected to the second body by the tilting unit; and
a lower plate secured to the lower portion of the fixed plate,
wherein the section defining portion is formed at the lower plate and configured such that a portion of the tilting unit is locked at the lower plate within the first section and the locked portion of the tilting unit is unlocked within the second section.

4. The terminal of claim 3, wherein the tilting unit comprises:
a first link member having one end rotatably connected to the movable plate and the other end rotatably connected to the second body, the first link member having a stopping portion protruding from one side thereof; and
a second link member that is shorter than the first link member, one end of the second link member being rotatably connected to the movable plate and the other end of the second link member being rotatably connected to the second body.

5. The terminal of claim 4, wherein:
the first link member and the second link member are inserted through the first slot;
a width of the first slot is narrower than a thickness of the stopping portion such that the stopping portion is locked at the first slot within the first section; and
the second slot extends from the first slot and the width of the second slot is greater than the thickness of the stopping portion such that the locked stopping portion is unlocked at the second slot within the second section.

6. The terminal of claim 4, wherein the first link member is connected to one end of the second body and the second link member is located at one side of the first link member.

7. The terminal of claim 4, wherein the rotation force providing portion is a torsion spring module mounted at the other end of the first link member to apply torque to the first link member.

8. The terminal of claim 3, wherein the tilting unit comprises:
a fixed member secured to the second body and rotatably coupled to the movable plate;
a rotation member having one end rotatably coupled to the fixed member by a first rotation point and the other end rotatably coupled to the movable plate by a second rotation point.

9. The terminal of claim 8, wherein:
the fixed member is inserted through the first slot;
the width of the first slot is narrower than a thickness of the rotation member such that the rotation member is locked at the first slot within the first section; and
the second slot extends from the first slot and the width of the second slot is greater than the thickness of the rotation member such that the locked rotation member is unlocked at the second slot within the second section.

10. The terminal of claim 8, wherein the rotational force providing portion comprises:
a first rod having one end rotatably connected to the first rotation point;
a second rod having one end rotatably connected to the second rotation point; and
a spring connected to the other ends of the first and second rods and configured to apply an elastic force when the first and second rotation points are close to each other such that relative rotation between the fixed member and the rotation member is facilitated.

11. The terminal of claim 10, wherein the movable plate is provided with a coupling hole configured to allow linear movement of the second rotation point.

12. The terminal of claim 3, further comprising:
spring modules mounted between the fixed plate and the movable plate and configured to apply an elastic force to the fixed plate and the movable plate upon relative sliding of the fixed plate and the movable plate.

13. The terminal of claim 3, wherein the sliding unit further comprises:
guide units configured to guide relative sliding of the fixed plate and the movable plate, wherein each of the guide units comprises a first guide member formed at a lower surface of the fixed plate and a second guide member formed at an upper surface of the movable plate and slidably coupled to the first guide member.

14. The terminal of claim 3, further comprising:
mounting portions that protrude upwardly from both sides of the movable plate and provide spaces for mounting the tilting unit.

15. The terminal of claim 3, wherein the fixed plate and the lower plate are integrally formed, wherein the movable plate moves within a space formed between the fixed plate and the lower plate.

16. The terminal of claim 1, wherein the activated tilting unit tilts the first body by generating and applying the rotational force to the sliding unit and allowing movement of the sliding unit via hinge units.

17. The terminal of claim 1, wherein the sliding unit is further configured to slide the first body relative to the second body within the second section.

18. The terminal of claim 1, wherein a shape of the rotational force providing portion is generally round.

19. A mobile terminal, comprising:
a first body;
a second body; and
a slide-tilt module comprising:
a sliding unit configured to slidably connect the first body to the second body such that the first body slides relative to the second body within a first section; and
a tilting unit configured to tilt the first body to a preset angle relative to the second body within a second section,
wherein:
the sliding unit is slidably coupled to the first body and rotatably connected to the second body by hinge units;
the tilting unit is connected to the second body to support the sliding unit and configured to apply a rotational force to the sliding unit to allow rotation of the sliding unit via the hinge units; and
the sliding unit comprises:
a sliding member comprising sliding rails allowing a slidable connection with the first body and the hinge units; and
a supporting member configured to support the sliding member and having a mounting portion for the tilting unit.

* * * * *